United States Patent
Davis

(10) Patent No.: US 7,800,894 B2
(45) Date of Patent: Sep. 21, 2010

(54) DATA STORAGE DEVICE ENCLOSURES, A MIDPLANE, A METHOD OF MANUFACTURING A MIDPLANE AND MODULES

(75) Inventor: David Michael Davis, Portsmouth (GB)

(73) Assignee: Xyratex Technology Limited, Havant (GB)

( * ) Notice: Subject to any disclaimer, the term of this patent is extended or adjusted under 35 U.S.C. 154(b) by 318 days.

(21) Appl. No.: 12/015,649

(22) Filed: Jan. 17, 2008

(65) Prior Publication Data

US 2008/0174948 A1 Jul. 24, 2008

Related U.S. Application Data

(60) Provisional application No. 60/885,716, filed on Jan. 19, 2007.

(51) Int. Cl.
G06F 1/16 (2006.01)
G06F 1/20 (2006.01)

(52) U.S. Cl. .............................. 361/679.33; 361/679.48

(58) Field of Classification Search ............ 361/679.33, 361/679.3, 679.48
See application file for complete search history.

(56) References Cited

U.S. PATENT DOCUMENTS

| | | | | |
|---|---|---|---|---|
| 4,479,198 A | * | 10/1984 | Romano et al. | 361/679.33 |
| 5,193,050 A | * | 3/1993 | Dimmick et al. | 361/679.46 |
| 5,224,020 A | * | 6/1993 | Golledge et al. | 361/679.48 |
| 5,247,427 A | * | 9/1993 | Driscoll et al. | 361/679.39 |
| 5,768,097 A | * | 6/1998 | Jelinger | 361/679.37 |
| 6,025,989 A | * | 2/2000 | Ayd et al. | 361/679.33 |
| 6,040,982 A | * | 3/2000 | Gandre et al. | 361/679.33 |
| 6,175,490 B1 | * | 1/2001 | Papa et al. | 361/679.48 |
| 6,351,375 B1 | * | 2/2002 | Hsieh et al. | 361/679.33 |
| 6,459,571 B1 | * | 10/2002 | Carteau | 361/679.33 |
| 6,594,150 B2 | * | 7/2003 | Creason et al. | 361/679.4 |
| 6,704,196 B1 | * | 3/2004 | Rodriguez et al. | 361/679.33 |
| 6,751,094 B2 | * | 6/2004 | Kolb et al. | 361/679.33 |
| 6,819,560 B2 | * | 11/2004 | Konshak et al. | 361/679.5 |
| 6,853,551 B2 | * | 2/2005 | Baar et al. | 361/679.33 |

(Continued)

FOREIGN PATENT DOCUMENTS

EP 1 372 155 A2 12/2003

(Continued)

OTHER PUBLICATIONS

Storage Bridge Bay (SBB) Specification, Version 1.0, Sep. 21, 2006, 87 pages.

*Primary Examiner*—Lisa Lea-Edmonds
(74) *Attorney, Agent, or Firm*—Pillsbury Winthrop Shaw Pittman LLP

(57) ABSTRACT

A data storage device enclosure for housing one or more data storage devices is disclosed. The enclosure has housed therein a plurality of modules, at least one of the modules being a power supply module and at least one of the modules being an electronics module. Each module has a first dimension of substantially n*w and a second dimension of substantially m*h, where n and m are integers that may be different for each module, wherein w=(the width of the enclosure $W_E$/an integer between 1 and 6 inclusive) and h=(the height of the enclosure $H_E$/an integer), w, h, $W_E$ and $H_E$ each being measured in the same plane. The first dimension of said electronics module is twice the first dimension of said power supply module.

38 Claims, 26 Drawing Sheets

U.S. PATENT DOCUMENTS

| | | | |
|---|---|---|---|
| 6,906,914 B2* | 6/2005 | Stamos et al. | 361/679.31 |
| 7,193,845 B2* | 3/2007 | Titus | 361/679.33 |
| 7,193,847 B2* | 3/2007 | Liang et al. | 361/679.48 |
| 7,236,358 B2* | 6/2007 | Dobbs et al. | 361/679.31 |
| 7,362,565 B2* | 4/2008 | Imblum | 361/679.33 |
| 7,362,566 B1* | 4/2008 | Sivertsen | 361/679.33 |
| 7,375,923 B2* | 5/2008 | DeCenzo et al. | 361/679.48 |
| 7,554,803 B2* | 6/2009 | Artman et al. | 361/679.49 |
| 2003/0112598 A1* | 6/2003 | Yokosawa | 361/679.48 |
| 2004/0100765 A1* | 5/2004 | Crippen et al. | 361/679.48 |
| 2005/0099766 A1* | 5/2005 | Fraley et al. | 361/679.3 |
| 2006/0012950 A1* | 1/2006 | Shih | 361/679.3 |
| 2007/0247804 A1* | 10/2007 | Li et al. | 361/679.48 |
| 2007/0293137 A1* | 12/2007 | Crippen et al. | 361/679.48 |

FOREIGN PATENT DOCUMENTS

| | | |
|---|---|---|
| WO | WO 2006/007467 A2 | 1/2006 |

* cited by examiner

DATA STORAGE DEVICE ENCLOSURES, A MIDPLANE, A METHOD OF MANUFACTURING A MIDPLANE AND MODULES

This application claims the benefit of priority to U.S. application Ser. No. 60/885,716, filed Jan. 19, 2007, the content of which is hereby incorporated by reference.

The present invention relates to data storage device enclosures, a midplane, a method of manufacturing a midplane, a plurality of modules and a plurality of data storage device enclosures.

In preferred embodiments, the present invention relates to storage enclosures for a plurality of disk drives, "redundant array of inexpensive disks" (RAID) arrays, "storage array network" (SAN) or "network attached storage" (NAS) storage, server enclosures and the like.

Note, as is conventional, references to "widths" and "heights", "above", "below", etc, in relation to the enclosure and/or its bays are given with reference to the orientation of a conventionally mounted enclosure, i.e. one mounted laterally in a 19 inch rack. References to "above" and "side" in relation to the enclosure should be interpreted consistently with this. Nonetheless, these terms should also be construed accordingly to cover a situation where the enclosure is arranged so as to be turned on its side to be vertically arranged, or indeed in any orientation.

FIG. 1 shows a typical prior art data storage device enclosure. The enclosure 1 is modular, having disk drive module bays 2 at the front of the enclosure 1 for receiving disk drive modules 3 (i.e. disk drive assemblies mounted in carriers), and bays 4, 6, 8 at the rear of the enclosure for receiving various modules, such as power supply units (PSUs) 5, cooling modules 7 and various electronics modules 9. These electronics modules 9 typically include one or more controllers for the disk drive assemblies, providing input/output connections to the enclosure, "just a bunch of disks" (JBOD) functionality or "switched bunch of disks" (SBOD) functionality or "expander-based bunch of disks" (EBOD) functionality based on "SAS expander" technology and/or RAID functionality. The electronics modules 9 may also provide enclosure management services or other functionality. The various modules 3, 5, 7, 9 plug into a midplane (not shown) within the enclosure 1 via connectors. The modules 3, 5, 7, 9 are removable from the enclosure 1 for maintenance and/or replacement. Often modules 5, 9 at the rear of the enclosure 1 are provided in duplicate or more so that a certain measure of redundancy can be provided in case of failure of a module. Many other layouts and configurations of data storage enclosures 1 are possible and, indeed, available commercially.

Typically when designing a storage enclosure 1, the starting point is the number or type or arrangement of disk drive assemblies to be accommodated within the enclosure 1 and/or the overall height of the enclosure 1. Note, enclosures 1 are commonly designed to be mounted in standard 19 inch (approx. 483 mm) racks, thereby fixing their width. The height however may vary. For example, the enclosure 1 may be specified as being 2 U or 4 U in height, the unit "U" being a standard unit for height in the field of storage enclosures equal to 1.75 inches (approx. 44 mm). A 2 U enclosure may accommodate for example twelve 3.5 inch disk drives arranged in a three rows of four (as shown in FIG. 1a) or a number of 2.5 inch (approx. 63.5 mm) disk drives, or a 3 U enclosure may accommodate fifteen 3.5 inch (approx. 89 mm) drives turned sideways in a row.

Once the number and layout of disk drive modules 3 and the height of the enclosure 1 have been decided, conventionally the rest of the enclosure 1 and the rear modules 5, 7, 9 are designed with the space available in mind as determined by the height of the enclosure 1 and the number of disk drive modules 3. Thus between different enclosures 1 the various rear modules 5, 7, 9 will not have the same sizes, proportions, physical interfaces and/or functionality and thus cannot be exchanged between two different enclosures 1. Not only does this apply to enclosures made by different manufacturers, but even to different enclosures made by the same manufacturer. When designing a new enclosure 1, a manufacturer will typically redesign some or all of the rear modules of the enclosure 1 from scratch.

For example, FIGS. 2a, 2b, 2c show prior art storage enclosures manufactured by Infortrend Technology Inc., Taiwan. (It should be noted that this example of enclosures by Infortrend Inc. has been chosen for illustrative purposes. Similar examples exist for practically all manufacturers, including the owner of the present invention.) FIG. 2a shows a 2 U storage enclosure 1 having two power supply modules 5, three cooling modules 7 and an electronics module 9. FIG. 2b shows a 3 U storage enclosure 1 having two power supply modules 5, two cooling modules 7 and an electronics module 9. Each of these modules 5, 7, 9 is different from the corresponding module 5, 7, 9 of FIG. 2a, either having a different form factor or size or functionality. FIG. 2c shows a 4 U storage enclosure having three power supply modules 5, two cooling modules 7 and several electronics modules 9. Again, each of these modules 5, 7, 9 is different from the corresponding modules 5, 7, 9 of FIG. 2a and/or FIG. 2b, although the power supply modules 5 appear to have a broadly similar form factor. As can be seen, for each of the enclosures 1 of FIGS. 2a, 2b and 2c, the rear modules have been redesigned with little or no commonality between the modules of the enclosures 1.

This is all disadvantageous as the manufacturer has to design more parts each time a new storage enclosure 1 is required. This is also disadvantageous to the end user, since the end user has to maintain a larger collection of field replaceable units, i.e. spare modules, so as to have available spares for each different enclosure 1 in case a module needs to be replaced or swapped.

In some cases, it is known for a single type of rear module to be commonly used across a number of different but closely related enclosures 1. However, in these cases it is generally necessary to redesign the other modules in the rear of the enclosure 1 to accommodate the common module, for example by redesigning the power supply modules 5 with a higher power rating or a different cooling arrangement. Thus, the manufacturer is forced to undertake significant redesign effort each time, despite including a common module.

According to a first aspect of the present invention, there is provided a data storage device enclosure for housing one or more data storage devices, the enclosure having housed therein a plurality of modules, at least one of the modules being a power supply module and at least one of the modules being an electronics module, wherein each module has a first dimension of substantially n*w and a second dimension of substantially m*h, where n and m are integers that may be different for each module, wherein w=(the width of the enclosure $W_E$/an integer between 1 and 6 inclusive) and h=(the height of the enclosure $H_E$/an integer), w, h, $W_E$ and $H_E$ each being measured in the same plane, wherein the first dimension of said electronics module is twice the first dimension of said power supply module.

This effectively provides a common form factor of unit size for the various modules, which allows organisation of the modules in common enclosure sizes that makes best use of space and is scalable and flexible and can provide common functionality. This is advantageous to the manufacturer, who can manufacture and stock a common set of modules and can select as appropriate from the modules when designing new enclosures according to the requirements of the enclosure. Flexibility is also provided, since the manufacturer can easily select for example power supply modules having different power ratings for different enclosures and different electronics modules. Power supply redundancy can also be provided in this way. Electronics modules can also be maintained that provide different common storage enclosure functionality such as RAID functionality or JBOD functionality. In this way redesign effort is saved each time a manufacturer wants to produce a new storage enclosure.

This is also advantageous to end users, who may have many different storage enclosures in their organisation. The common, unit size form factor of the preferred modules of the present invention allows modules to be more easily interchanged between enclosures. This allows the end user to stock fewer spare modules for replacing failed modules in their storage enclosures, since, for example, one spare power supply module can be kept to replace a failed power supply module in any of their storage enclosures.

This aspect also aids compatibility of modules between enclosures of different manufacturers as well as of the same manufacturer.

In the preferred embodiment, the rear of the storage enclosure can be considered as being overlaid by a notional square or rectangular grid, the one set of parallel lines being separated by a distance of w from adjacent lines and the other set of parallel lines being separated by a distance of h from adjacent lines. The dimensions of the modules then allow the modules to be populated into the storage enclosure such that they each coincide with a cell or multiple cells of the grid. This arrangement provides an efficient use of space whilst providing scalability and great flexibility. Preferably all of the grid is capable of being fully populated by the plurality of modules.

Preferably said modules are each square or rectangular in cross-section in said plane of measurement. This gives a particularly efficient use of space and makes design of the modules more simple, since storage enclosures typically have a rectangular aspect from the rear where modules are received.

In a preferred embodiment, the power supply module is positioned adjacent the electronics module and is arranged to draw cooling air through the electronics module. With this arrangement, an airflow can be provided for the electronics module and the electronics module and optionally any other part of the enclosure so that the components therein are cooled. Thus again, the manufacturer of a new enclosure can simply select from a set of modules to implement the required functionality of the enclosure and appropriately arrange the modules in the enclosure and provision is automatically made for the cooling arrangement. Thus redesign effort is saved for the manufacturer.

In a preferred embodiment, the enclosure has a midplane, wherein the at least one power supply module comprises: a box-like housing having opposed first and second end faces and four side faces, the first end face having a connector for connecting to the midplane such that the second end face is accessible externally of the enclosure when positioned in the enclosure; a first air inlet provided in the first end face; a second air inlet provided in a side face; an air outlet provided in the second end face; and, a fan positioned adjacent the air outlet arranged so as to draw in air through the first and second air inlets, through the housing, and to vent the air through the air outlet. This arrangement allows the enclosure and the various modules contained therein to be cooled when the modules are arranged in a variety of configurations and the manufacturer/end user can be less concerned about having to make other, special arrangements for cooling because in effect, the air flow arrangements effectively "automatically" orientate themselves to be in the correct or appropriate position. When mounted in a suitable enclosure, the power supply fan draws air through the enclosure and through the power supply, thereby cooling both. In particular, the first inlet can be arranged to draw air from the front of an enclosure through its midplane, whereas the second inlet can be arranged to be adjacent the electronics module so as to draw air from the front of the enclosure through the midplane and then across the components in the electronics module, thereby cooling the electronics module.

In a preferred embodiment, the enclosure has a height of 2 U and width of $W_E$ and comprises: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays. This provides a flexible and scalable organisation of modules in a commonly sized 2 U storage enclosure.

In a further preferred embodiment, the enclosure has a height of 3 U and width of $W_E$ and comprises: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays so as to be within an envelope having a width of $W_E$ and a height of 2 U.

In another preferred embodiment, the enclosure has a height of 4 U and width of $W_E$ and comprises: a first bank and a second bank of bays, each bank having a height of 2 U and a width of $W_E$ positioned one on top of the other, each bank having a first bay and a second bay each having a width of $W_E/4$ and a height of 2 U for receiving respective first and second of said power supply units, the power supply bays being at either side of the enclosure; and, a first bay and a second bay each having a width of $W_E/2$ and a height of U for receiving respective first and second of said electronics modules, the electronics module bays being positioned one on top of the other and between the power supply bays. This provides a flexible and scalable organisation of modules in a commonly sized 4 U storage enclosure.

Preferably, the first and second power supply bays are arranged such that the position and orientation of the first power supply module is a 180 degrees rotation of the position and orientation of the second power supply module about an axis perpendicular to said plane of measurement. This positioning and orientation helps allow a single design of power supply module to be used. This also helps avoid conflicts on the midplane of the enclosure between connectors for the power supply modules and disk drive modules.

Preferably, the enclosure has a midplane, wherein the plurality of modules includes at least two power supply modules each comprising: a box-like housing having opposed first and second end faces and four side faces, the first end face having a connector for connecting to the midplane such that the second end face is accessible externally of the enclosure when positioned in the enclosure; a first air inlet provided in the first end face; a second air inlet provided in a side face; an air outlet provided in the second end face; and, a fan positioned adjacent the air outlet arranged so as to draw in air through the first and second air inlets, through the housing, and to vent the air through the air outlet; wherein each power supply module is positioned and orientated so that each of said respective second air inlets faces inwards towards its adjacent electronics module, so that each of said respective fans draws air through its adjacent electronics module bay in use. This simplifies the cooling arrangement in the enclosure. The orientation and positioning of the power supplies means that they can have a single design of electronics module having a single air inlet, which faces the electronics modules for drawing through the enclosure and through the electronics modules. Thus using the preferred modular approach of the present invention, the enclosure can receive adequate cooling airflow.

Preferably, the first and second electronics module bays are arranged such that the position and orientation of the first electronics module is a 180 degrees rotation of the position and orientation of the second electronics module about an axis perpendicular to said plane of measurement. For example, in a 2 U enclosure, this arrangement allows the main circuit board of each of the electronics modules to be positioned close to the outside of the enclosure, which creates a large air plenum between the two circuit boards. The hottest components on the circuit boards will extend into this plenum, and will therefore benefit from the cooling airflow created in the plenum. This also helps avoid conflicts on the midplane of the enclosure between the connectors for the electronics modules and for the disk drive modules.

In yet another preferred embodiment, the enclosure has a height of 4 U and width of $W_E$ and comprises: a first bay, a second bay, a third bay and a fourth bay each having a width of 2 U and a height of $W_E/4$ for receiving respective first, second, third and fourth power supply units, the power supply bays being adjacent each other so as to be within an envelope having a width of 8 U and a height of $W_E/4$; and, a first bay and a second bay each having a width $W_E/2$ and a height of U for receiving respective first and second electronics modules, the electronics module bays being positioned adjacent each other so as to be within an envelope having a width of $W_E$ and a height of U. This arrangement provides a flexible and scalable organisation of modules in a 4 U storage enclosure.

The enclosure may have a plurality of adjacent bays having the same width and height that are capable of receiving a corresponding number of individual modules or a single module having a correspondingly greater value of n or m. This again adds to the flexibility of the enclosure in receiving different modules with different functionality which may require more space in a module to implement. For example, double height power supply modules may be provided, which are capable of sourcing more power than single height modules. Similarly, double height electronics modules may be provided if more space is required to implement a particular functionality for the enclosure.

In an embodiment, the enclosure comprises at least one cooling module, wherein the enclosure can accept the cooling module in place of at least one power supply module. This provides the flexibility of the enclosure being able to receive a cooling module to provide a cooling airflow in the enclosure, instead of relying on the fan of a power supply module to provide the cooling airflow. Thus an enclosure may be configured for example with one power supply module and one cooling module in a situation where redundancy of power supply is not required.

In an embodiment, w is between about 102.5 mm and about 109.5 mm. In an embodiment, h is between about 36 mm and about 42 mm. This provides a particularly effective partitioning of the rear of a typically sized storage enclosure.

According to a second aspect of the present invention, there is provided a data storage device enclosure for housing one or more data storage devices, the enclosure having housed therein a plurality of modules, at least one of the modules being a power supply module and at least one of the modules being an electronics module, wherein each module has a first dimension of substantially n*w and a second dimension of substantially m*h, where n and m are integers that may be different for each module, wherein w=(the width of the enclosure $W_E$/an integer between 1 and 6 inclusive) and h=(the height of the enclosure $H_E$/an integer), w, h, $W_E$ and $H_E$ each being measured in the same plane, wherein the power supply module is positioned adjacent the electronics module and is arranged to draw cooling air through the electronics module.

Preferably, the first dimension of said electronics module is twice the first dimension of said power supply module. This provides more space for circuit boards in the electronics modules.

According to a third aspect of the present invention, there is provided a midplane for a data storage device enclosure, the midplane comprising: a circuit board having a front surface and a rear surface; a plurality of connectors on the front surface for connecting to respective data storage devices; a first power supply module connector and a first electronics module connector on the rear surface, the first power supply module connector and the first electronics module connector being generally elongate and having their long axes aligned in the direction of the width of the midplane; and, a second power supply module connector and a second electronics module connector on the rear surface, the second power supply module connector and the second electronics module connector being generally elongate and having their long axes aligned in the direction of the width of the midplane; the position and orientation of the second power supply module connector being a 180 degree rotation of the position and orientation of the first power supply module connector about an axis perpendicular to the plane of the circuit board; and, the position and orientation of the second electronics module connector being a 180 degree rotation of the position and orientation of the first electronics module connector about an axis perpendicular to the plane of the circuit board; wherein said connectors on the rear surface do not overlap with any of the connectors on the front surface.

This arrangement provides several advantages. Using this arrangement, the electronics modules may be arranged so that their main circuit boards are close to the outside of the enclosure. This forms a larger plenum for cooling air flow between the two circuit boards than would otherwise be formed, which helps in cooling the electronics modules and in particular the heat producing components on the circuit boards which can be positioned to extend into the plenum so as to receive cooling air. This arrangement also allows the power supply modules to be arranged so as an air inlet in each power supply module can be directed towards the electronics modules. This assists in ensuring that the airflow in the enclosure is front-to-back, as is generally preferred in the field of technology of storage enclosures. This also assists in allowing a single design of power supply module having a single air inlet to be used.

The arrangement also helps distribute the power supply connectors and the electronics module connectors such that a large open area is created on the circuit boards between these connectors. This space can be occupied by disk drive connectors on the other side of the circuit board. This helps prevent conflict between the disk drive connectors on one side of the circuit boards and the power module connectors and electronics module connectors on the other side. Also, the disk drives in a storage enclosure are typically arranged in an enclosure in one or more horizontal rows, and thus the disk drive connectors are typically arranged in one or more horizontal rows on the midplane, i.e. across the width of the midplane. By aligning the rear connectors in the direction along the width of the midplane, the rear connectors present a small vertical footprint. This makes is easier to avoid conflicts between the rear connectors and the horizontally arranged disk drive connectors. Avoiding conflicts between connectors helps simplify manufacture of the midplane. This is because where connectors conflict, it is usually necessary to employ so-called blind recess or "via" in the circuit boards to deal with the conflicts. Blind vias require the circuit board to be manufactured as multiple boards which are later laminated together. This increases the time and complexity of the manufacturing process and leads to increased cost of manufacturing. Preferably, the axes about which the rotations occur are substantially the same.

There may be provided in combination, a midplane as described above and a first electronics module and a second electronics module connected to the first electronics module connector and the second electronics module connector respectively, the first electronics module having a circuit board and the second electronics module having a circuit board, wherein the circuit boards of the first and second electronics modules are separated in order to create a plenum for cooling air between them.

There may be provided in combination, a midplane as described above and a first electronics module and a second electronics module connected to the first electronics module connector and the second electronics module connector respectively and a first power supply module and a second power supply module connected to the first power supply connector and the second power supply connector respectively, wherein each power supply is arranged to draw cooling air therethrough via a respective air inlet in its housing, the respective air inlets each being orientated towards the electronics modules.

According to a fourth aspect of the present invention, there is provided a method of manufacturing a midplane for a data storage device enclosure, the midplane comprising: a circuit board having a front surface and a rear surface; a plurality of connectors on the front surface for connecting to respective data storage devices; a first power supply module connector and a first electronics module connector on the rear surface, the first power supply module connector and the first electronics module connector being generally elongate and having their long axes aligned in the direction of the width of the midplane; and, a second power supply module connector and a second electronics module connector on the rear surface, the second power supply module connector and the second electronics module connector being generally elongate and having their long axes aligned in the direction of the width of the midplane; the position and orientation of the second power supply module connector being a 180 degree rotation of the position and orientation of the first power supply module connector about an axis perpendicular to the plane of the circuit board; and, the position and orientation of the second electronics module connector being a 180 degree rotation of the position and orientation of the first electronics module connector about an axis perpendicular to the plane of the circuit board; wherein said connectors on the rear surface do not overlap with any of the connectors on the front surface, the method comprising manufacturing the circuit board as a non-laminated piece.

As discussed above, this arrangement provides a simplified manufacturing process for producing a midplane over prior art processes where it is necessary to laminate together two or more separately made circuit boards.

According to a fifth aspect of the present invention, there is provided a plurality of modules for being housed in a data storage device enclosure, at least one of the modules being a power supply module and at least one of the modules being an electronics module, wherein each module has a width of substantially n*w and a height of substantially m*h, where n and m are integers that may be different for each module, wherein w is between about 102.5 mm and about 109.5 mm and h is between about 36 mm and about 42 mm.

This provides a flexible modular set of modules for being received in commonly sized storage enclosures.

According to a sixth aspect of the present invention, there is provided a plurality of data storage device enclosures, each enclosure comprising: at least one power supply bay for accepting a power supply module, each power supply bay of each enclosure having a first dimension of substantially n*w and a second dimension of substantially m*h, where n and m are integers, which may be different for the different power supply bays and for the different enclosures, such that power supply modules are interchangeable between said enclosures; and, at least one electronics module bay for accepting an electronics module, each electronics module bay of each enclosure having a first dimension of substantially n*w and a second dimension of substantially m*h, where n and m are integers, which may be different for the different electronics module bays and for the different enclosures, such that electronics modules are interchangeable between said enclosures, wherein w is between about 104.5 mm and about 110.5 mm and h is between about 38 mm and about 43 mm, wherein at least one of the number of bays or layout of bays is different for each enclosure.

This commonality of modules provides the advantages for a manufacturer of not having to redesign all modules in the enclosure when a new enclosure is being produced, and for the end user of not having to maintain a large stock of spare modules.

At least one enclosure may have a height of 2 U and a width of $W_E$ and comprises: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays.

At least one enclosure may have a height of 4 U and width $W_E$ and comprises a first bank and a second bank of bays, each bank having a height of 2 U and a width of $W_E$ positioned one on top of the other, each bank having: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays.

At least one enclosure may have a height of 4 U and width $W_E$ and comprises: a first bay, a second bay, a third bay and a fourth bay each having a width of 2 U and a height of $W_E/4$ for receiving respective first, second, third and fourth power supply units, the power supply bays being adjacent each other so as to be within an envelope having a width of 8 U and a height of $W_E/4$; and, a first bay and a second bay each having a width $W_E/2$ and a height of U for receiving respective first and second electronics modules, the electronics module bays being positioned adjacent each other so as to be within an envelope having a width of $W_E$ and a height of U.

Embodiments of the present invention will now be described by way of example with reference to the accompanying drawings, in which.

Figure 1A:
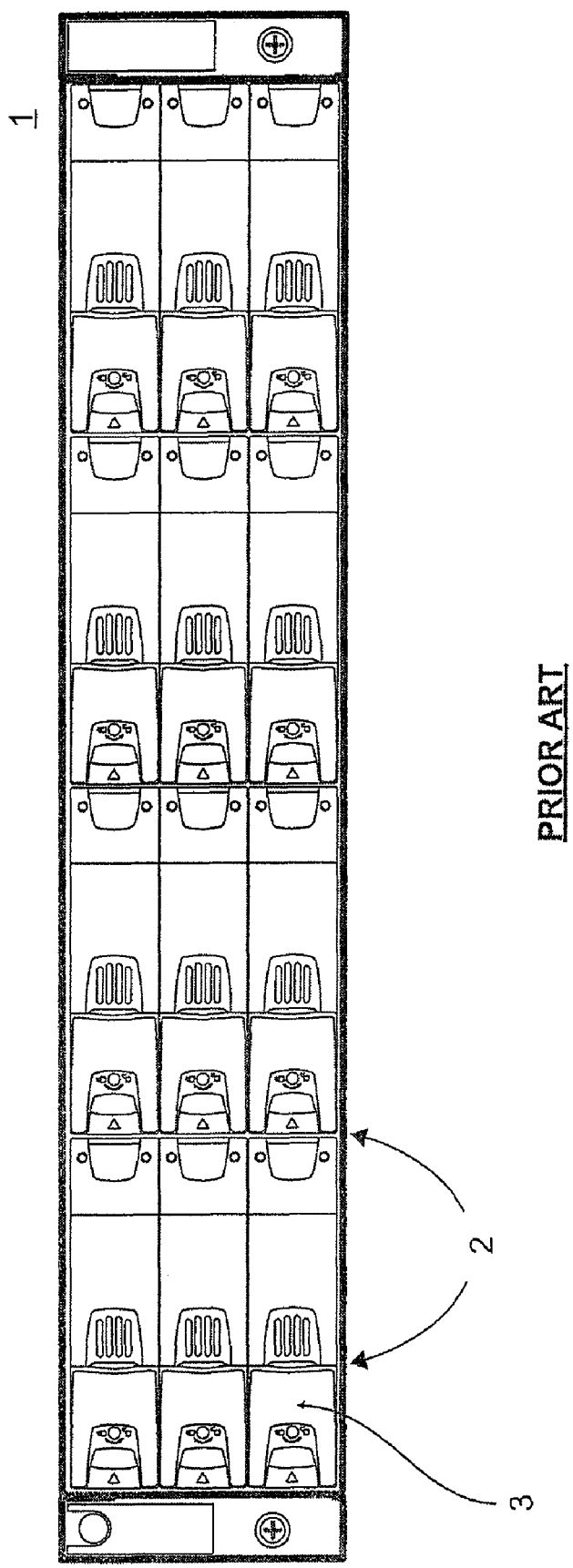
FIGS. 1a and 1b show an example of a prior art storage enclosure from the front and rear respectively.
Figure 1B:
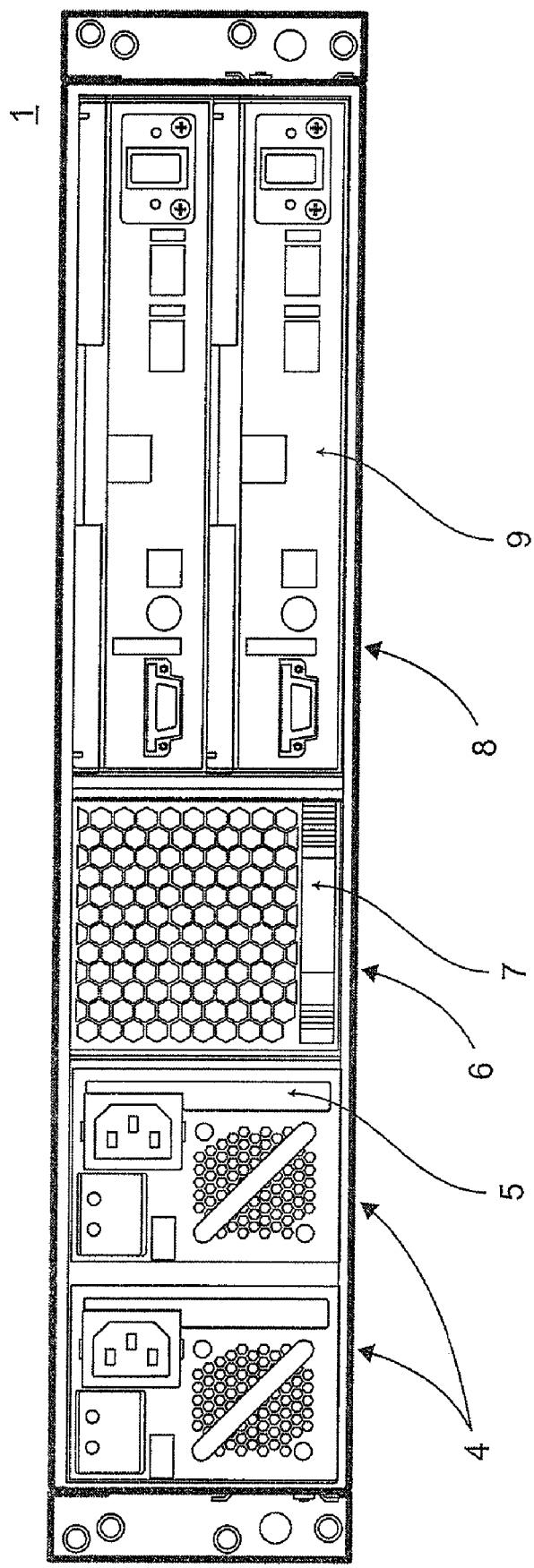
Figure 2A:
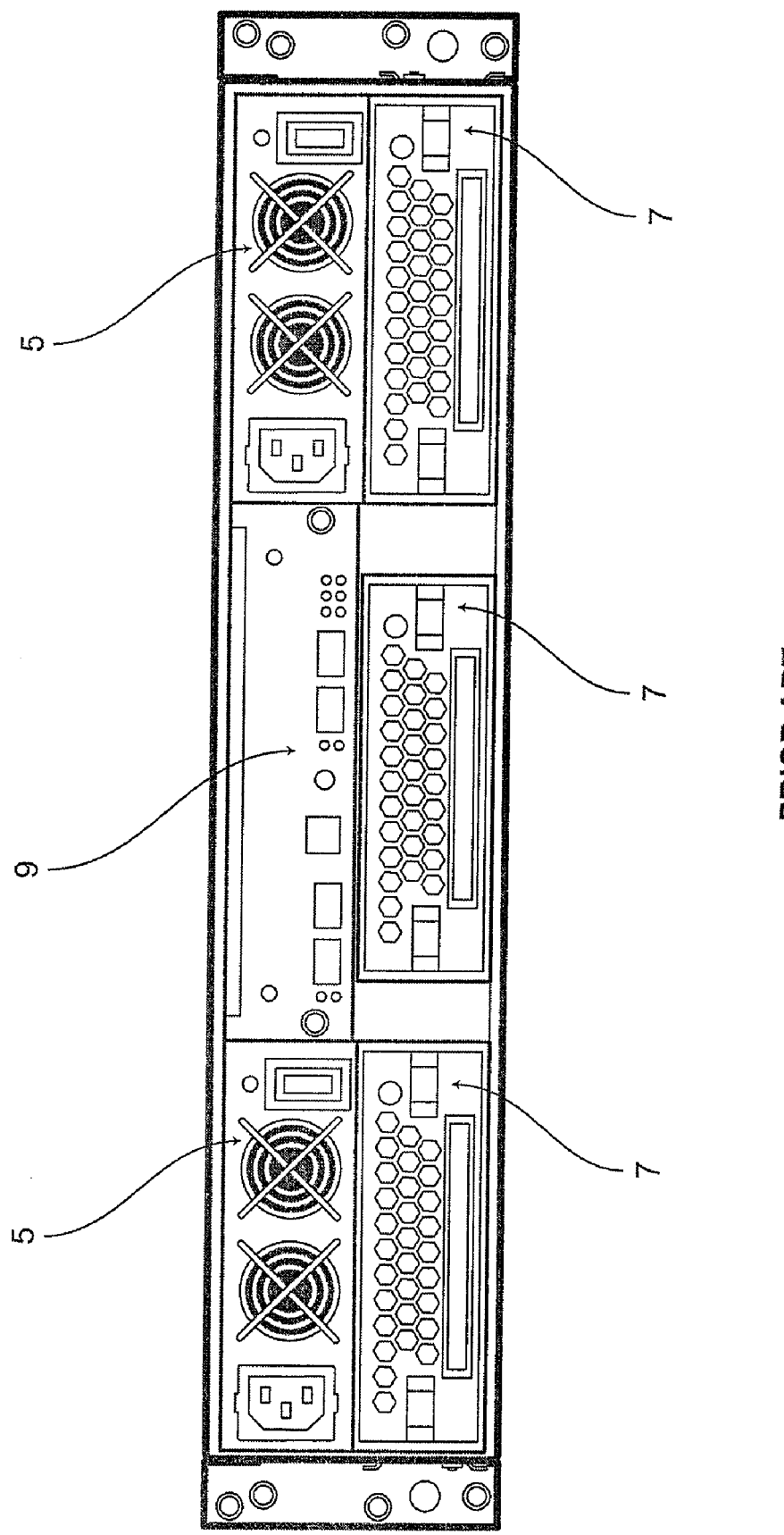
FIGS. 2a, 2b and 2c show prior art storage enclosures manufactured by Infortrend Technology Inc., Taiwan.
Figure 2B:
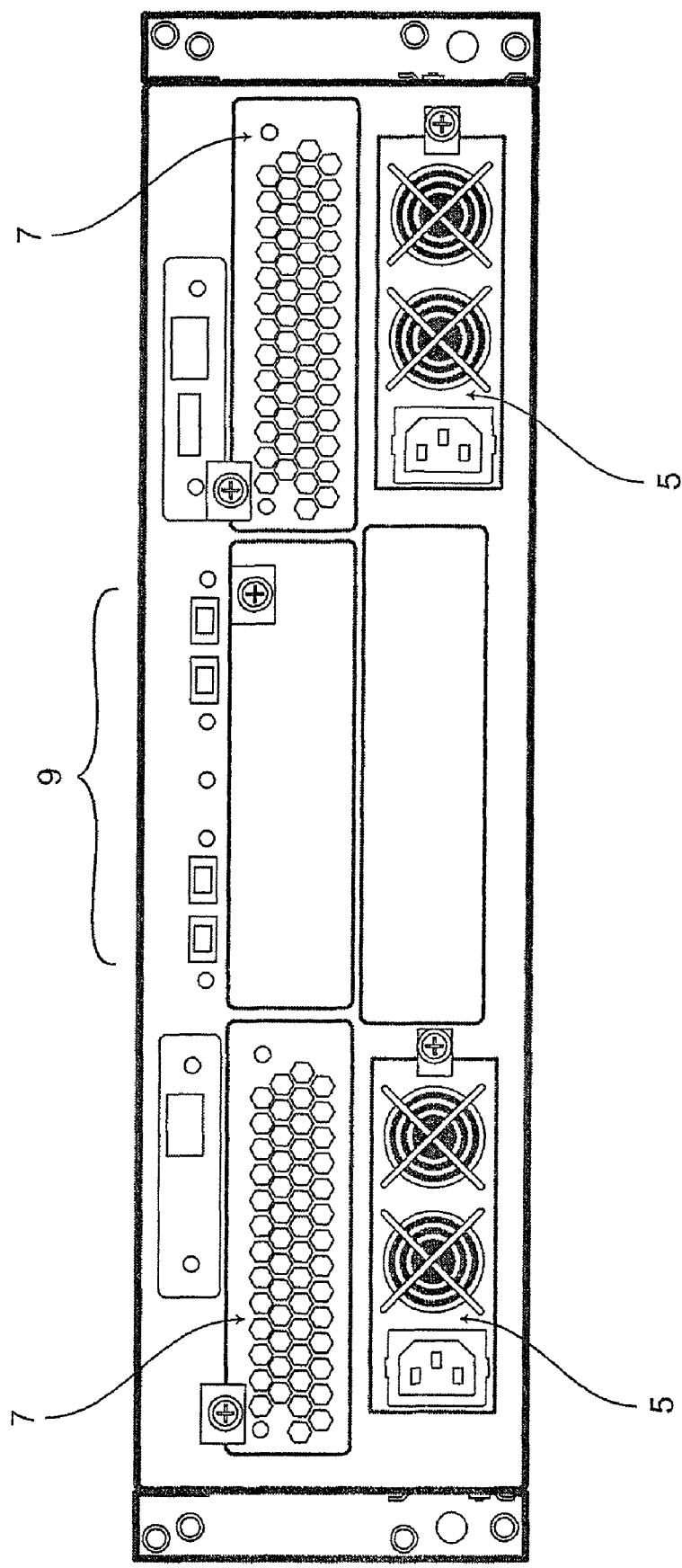
Figure 2C:
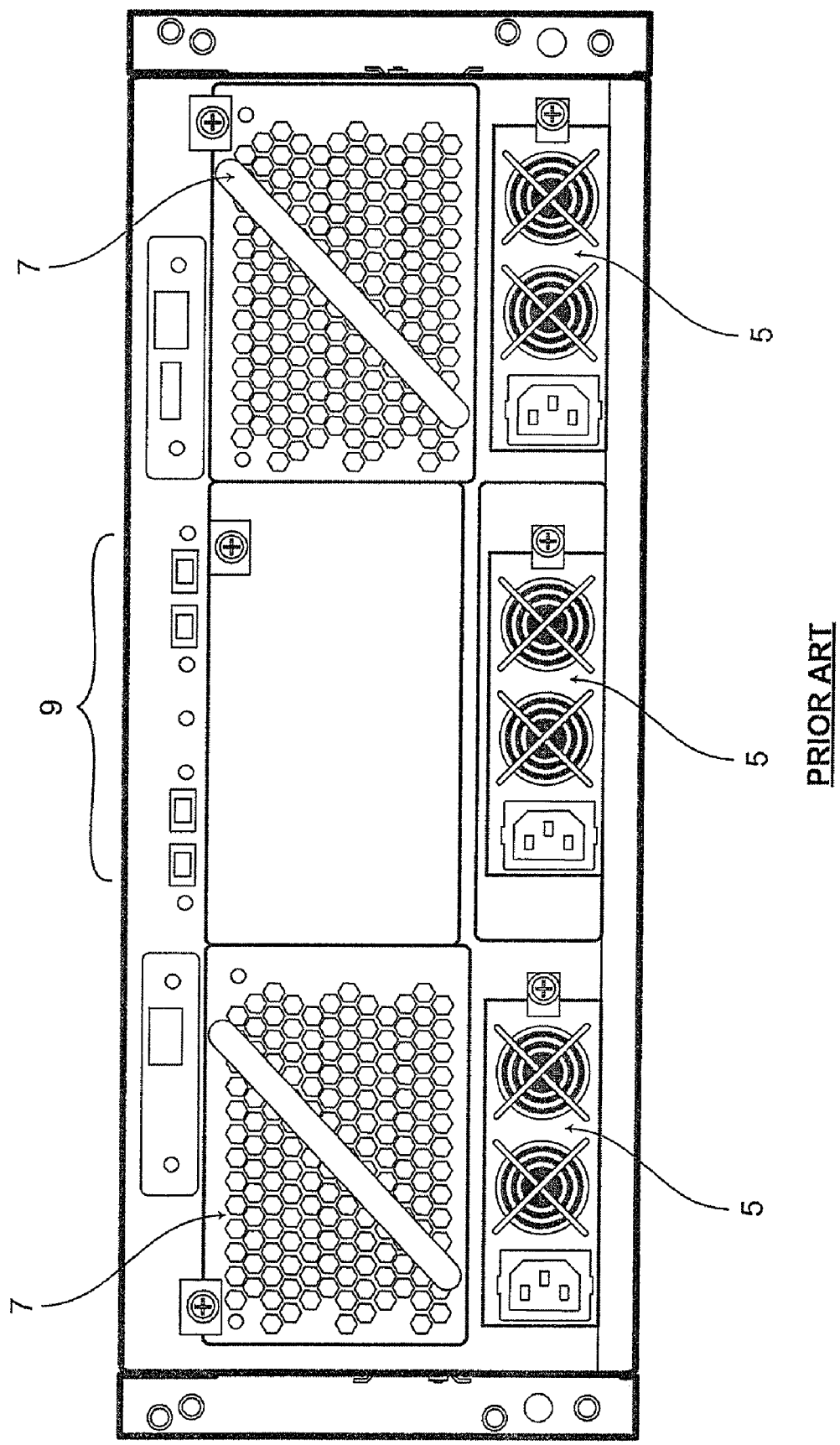
Figure 3:
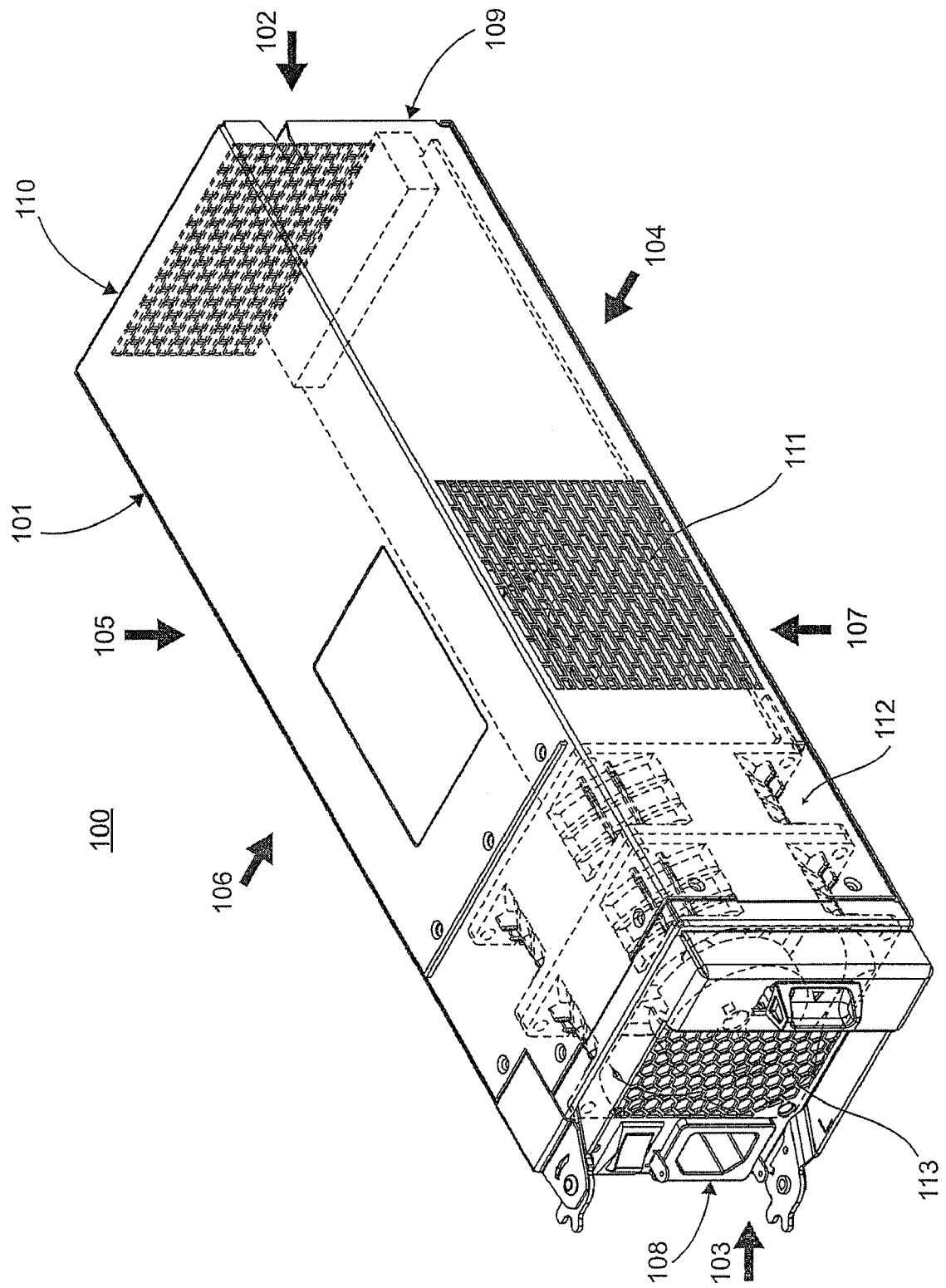
FIG. 3 shows an example of a power supply module in accordance with an embodiment of the present invention, with the housing shown partially transparently.
Figure 5A:
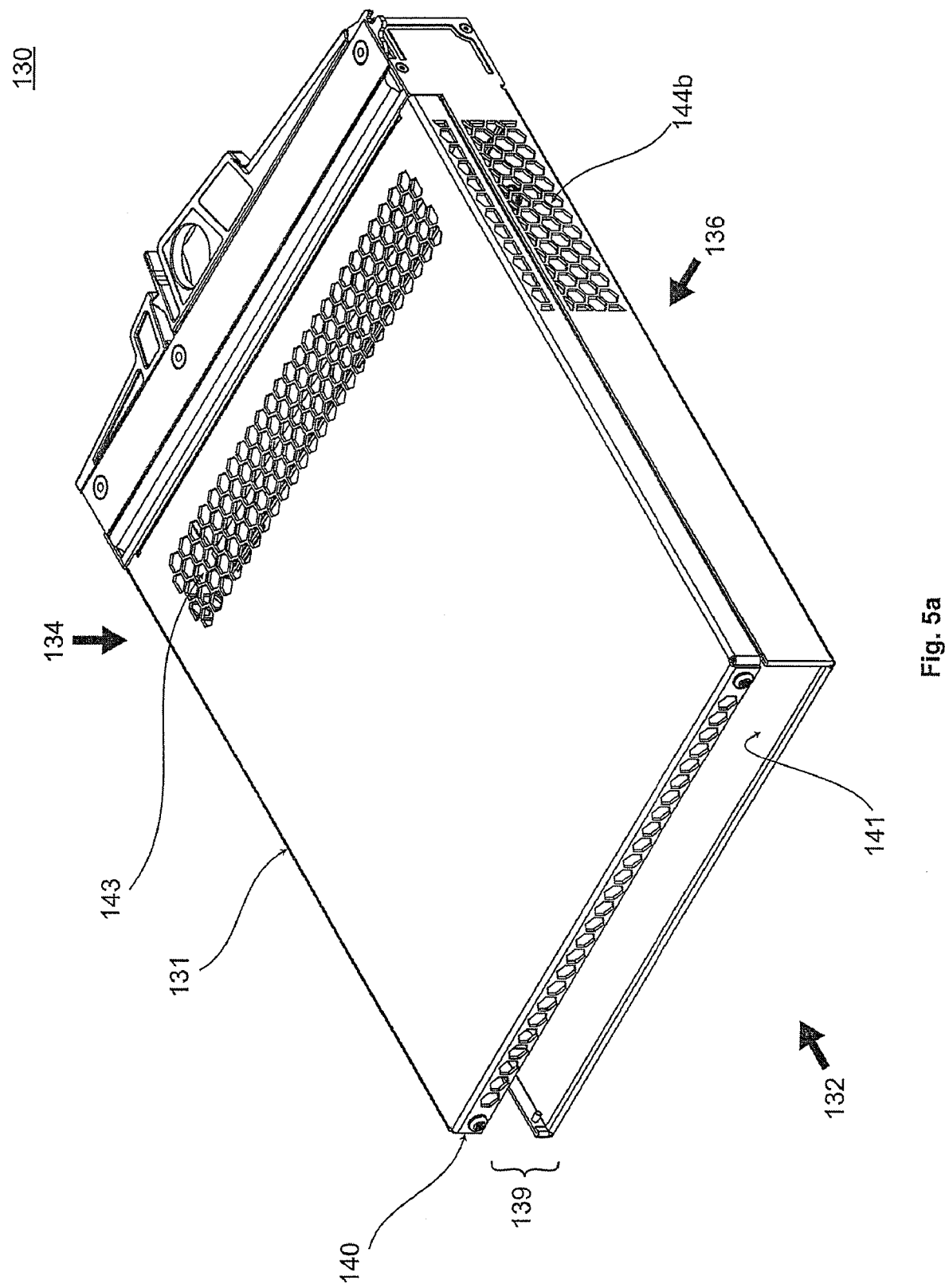
FIG. 5a shows an isometric projection from the rear and above of an example of an electronics module in accordance with an embodiment of the present invention and FIG. 5b shows an isometric projection of the same from the front and below.
Figure 5B:
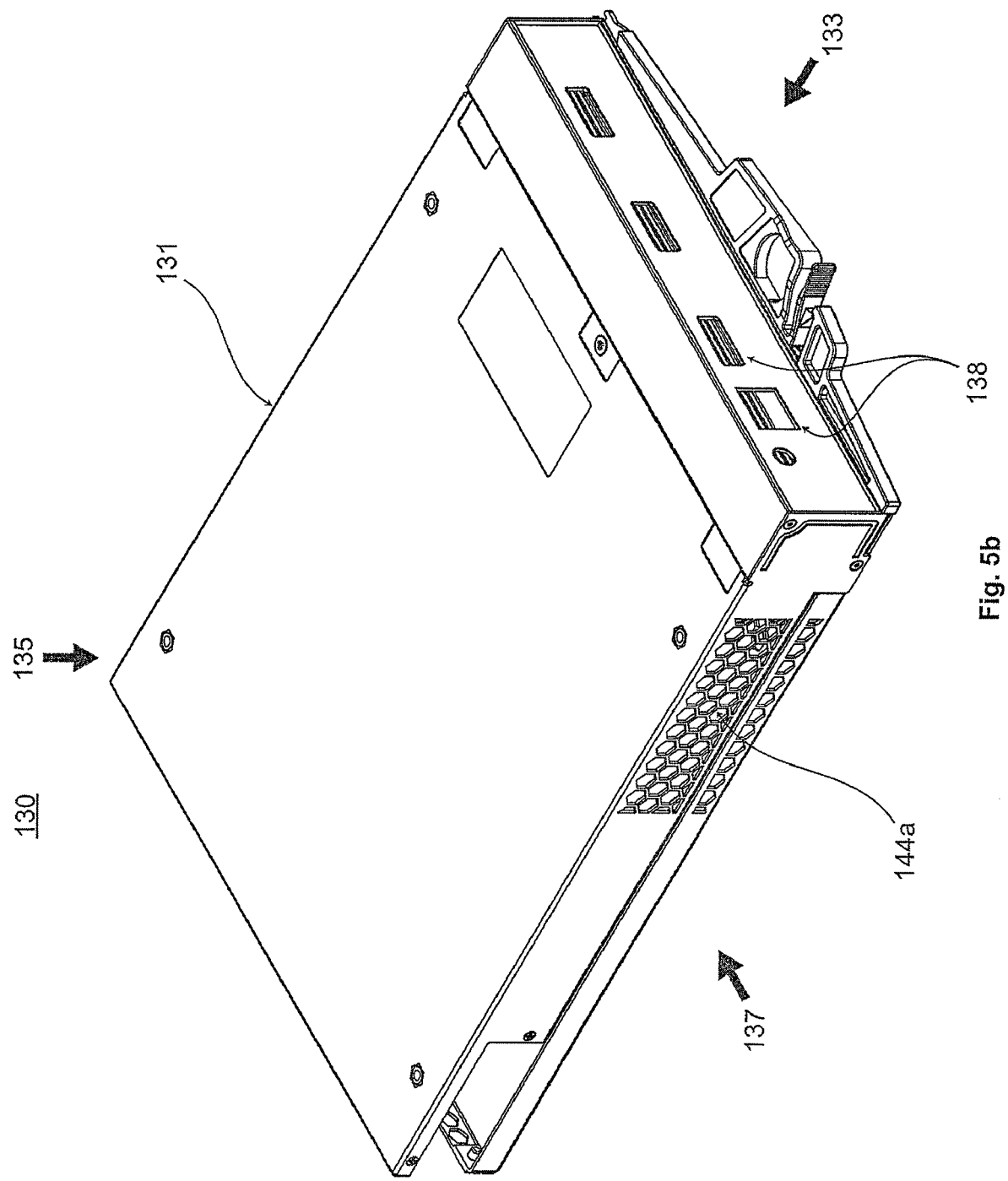
Figure 6A:
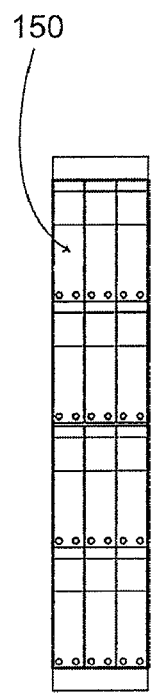
Figure 6B:
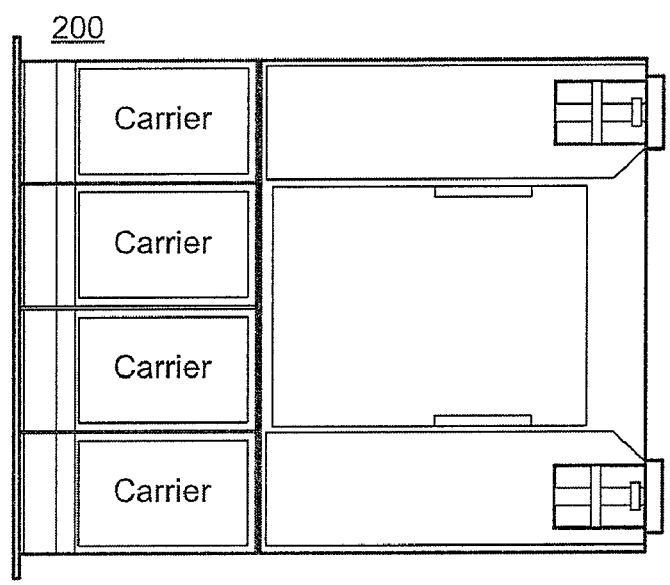
Figure 6C:
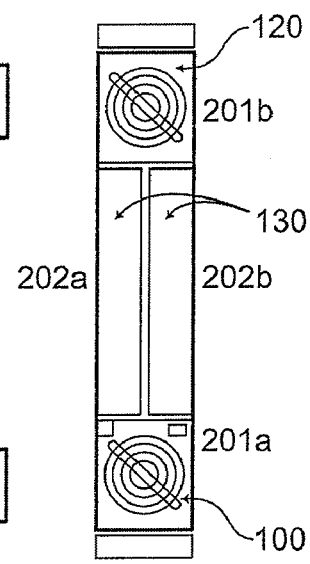
Figure 9A:
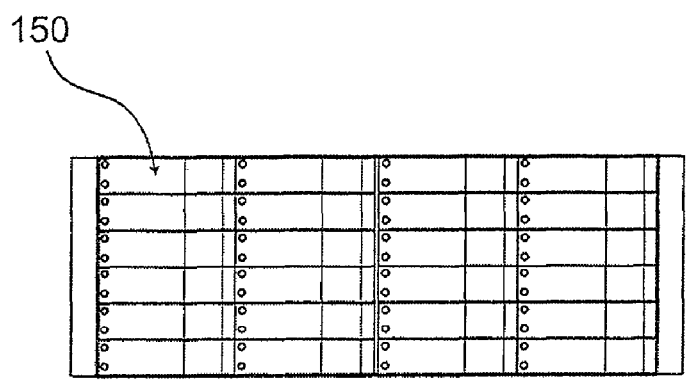
Figure 9B:
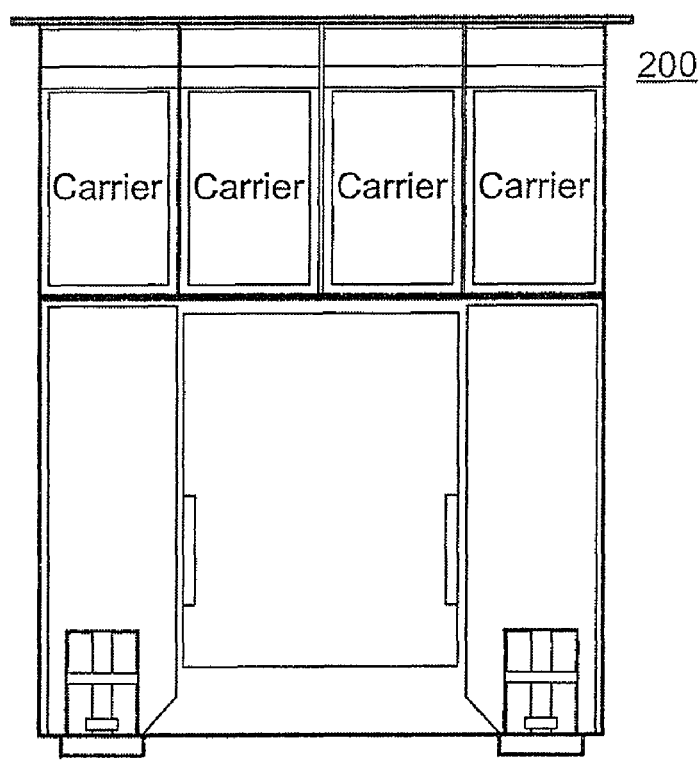
Figure 9C:
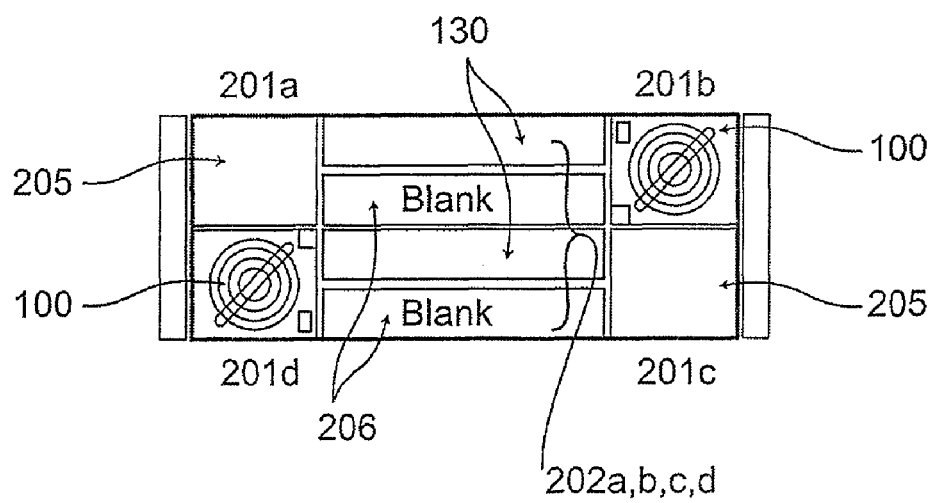
Figure 12:
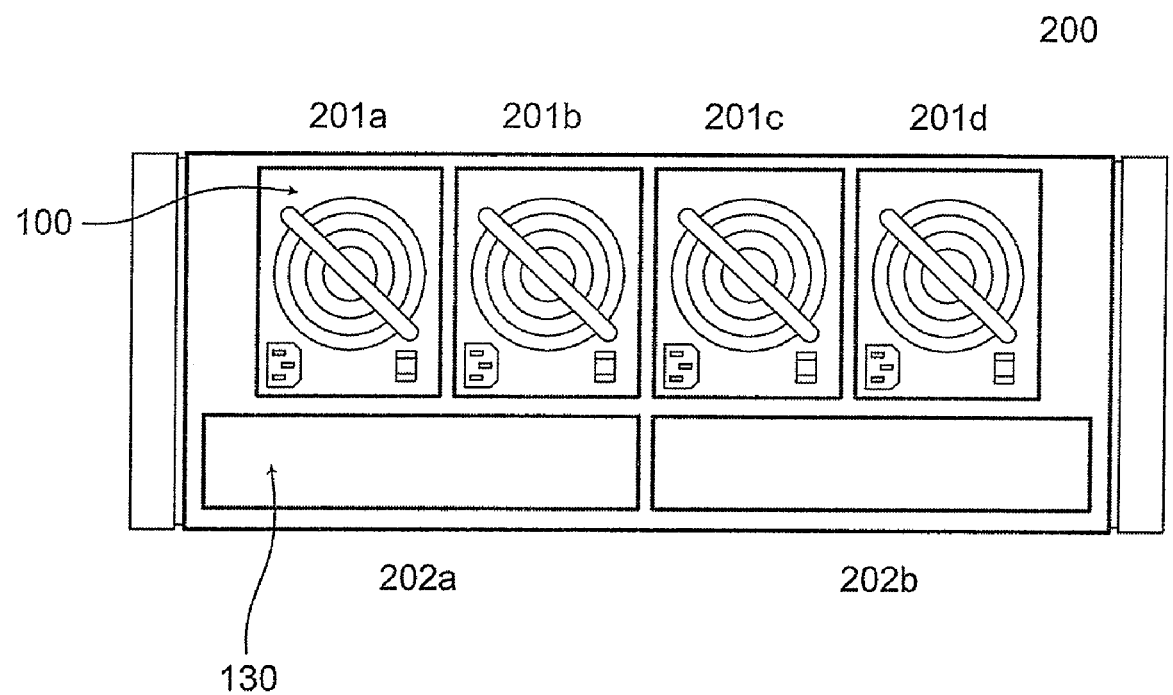
Figure 13A:
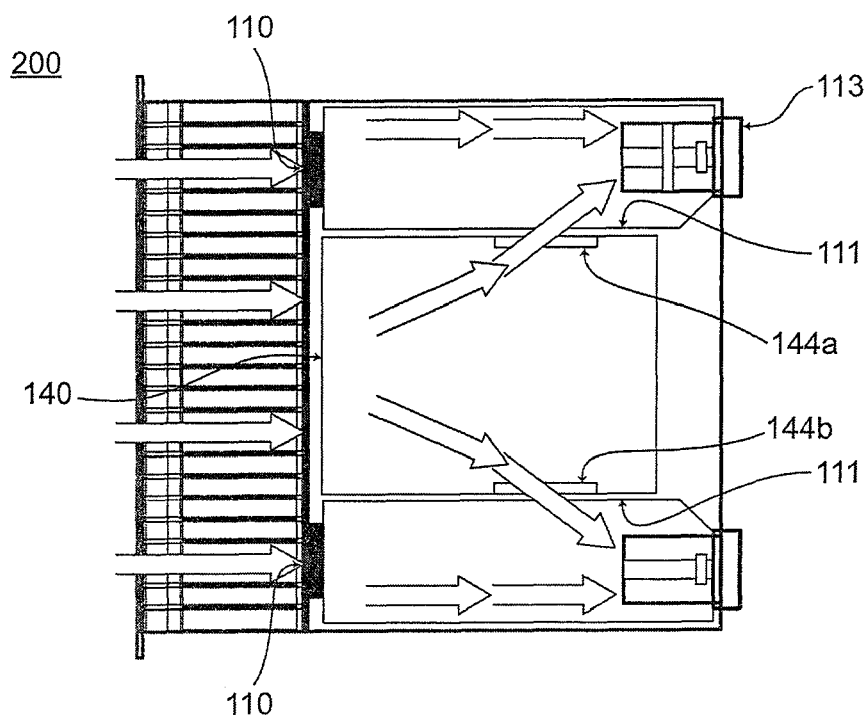
Figure 13B:
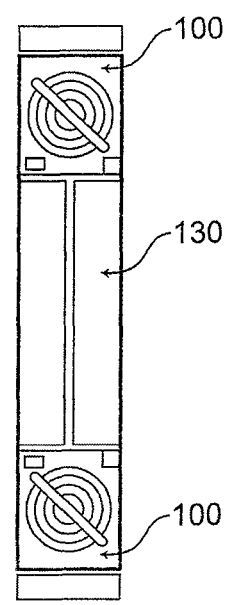
Figures 14A, 14B:
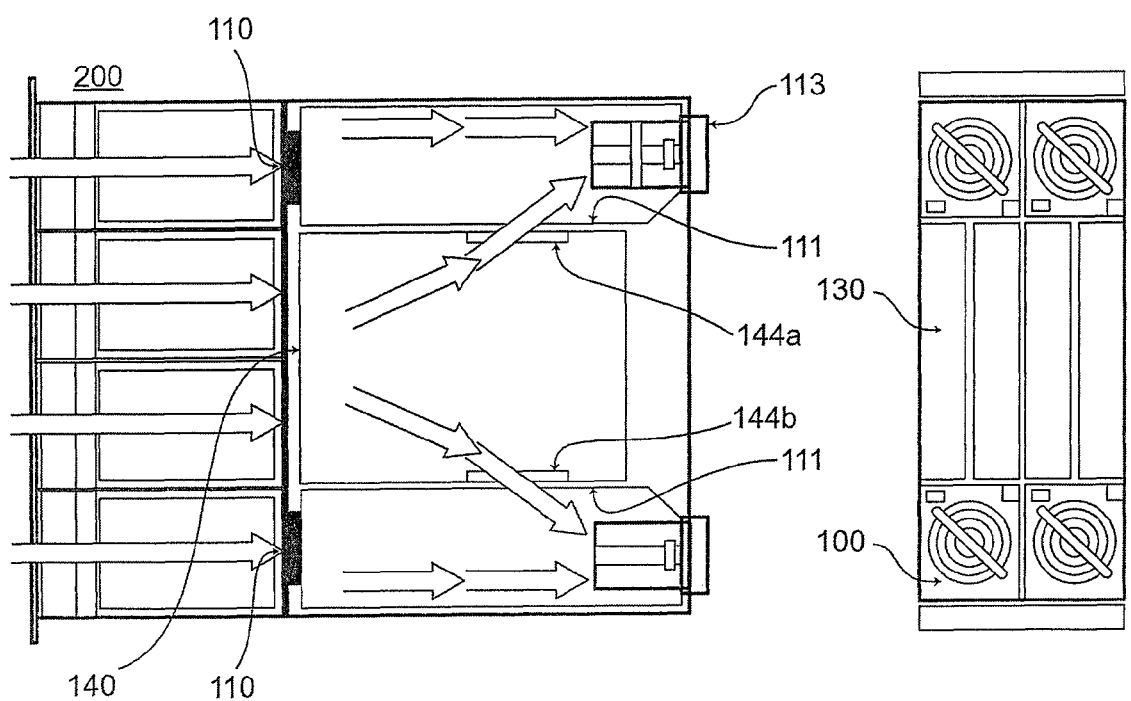
Figures 15A, 15B:
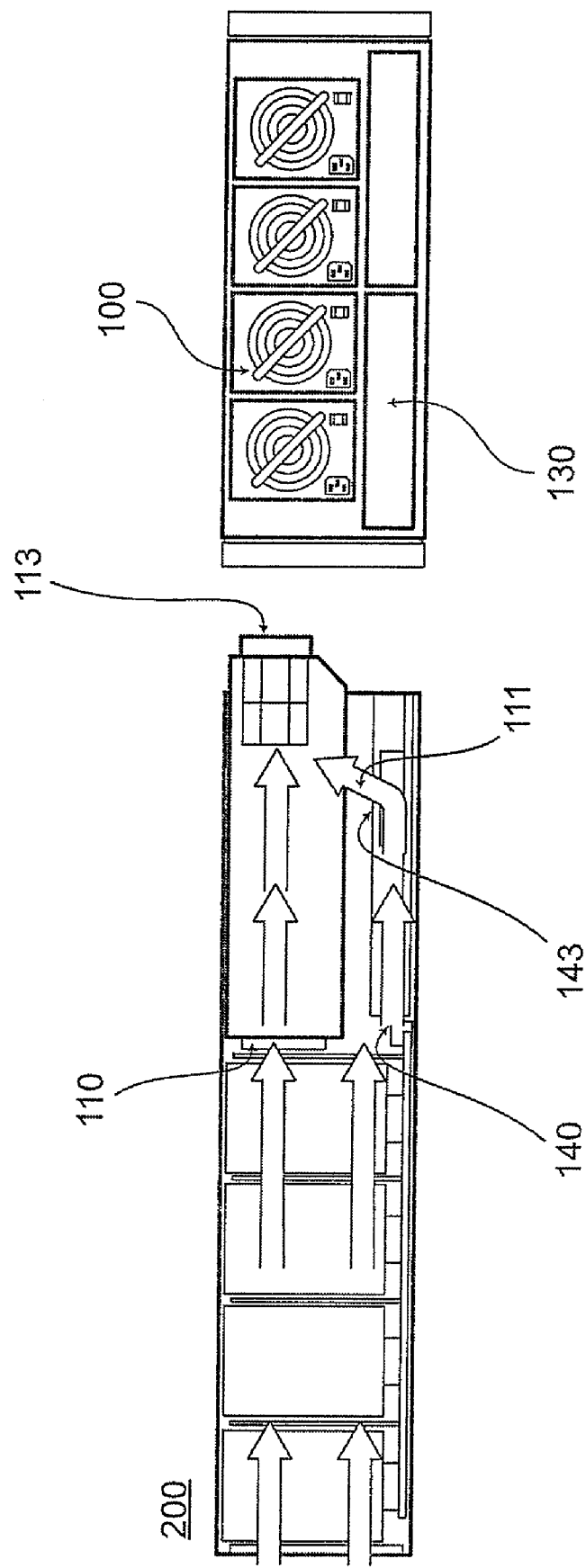
Figure 16:
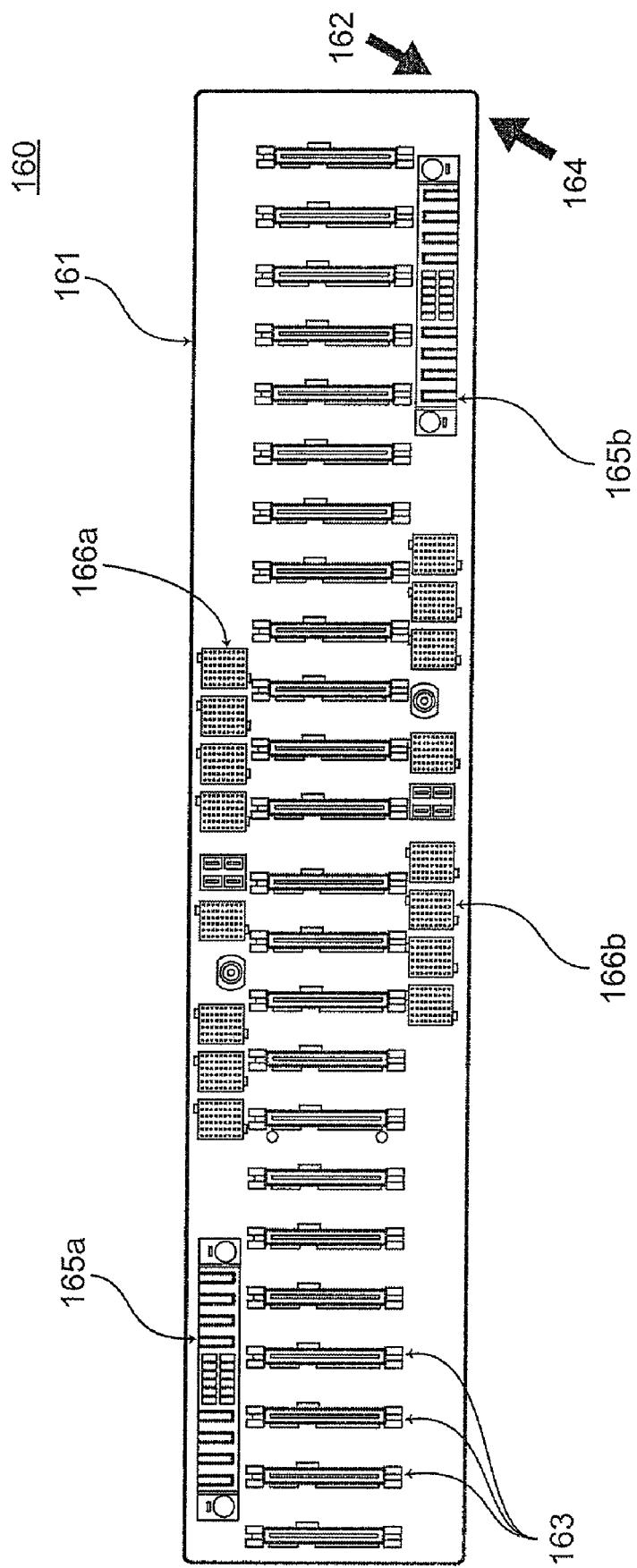
Figure 17:
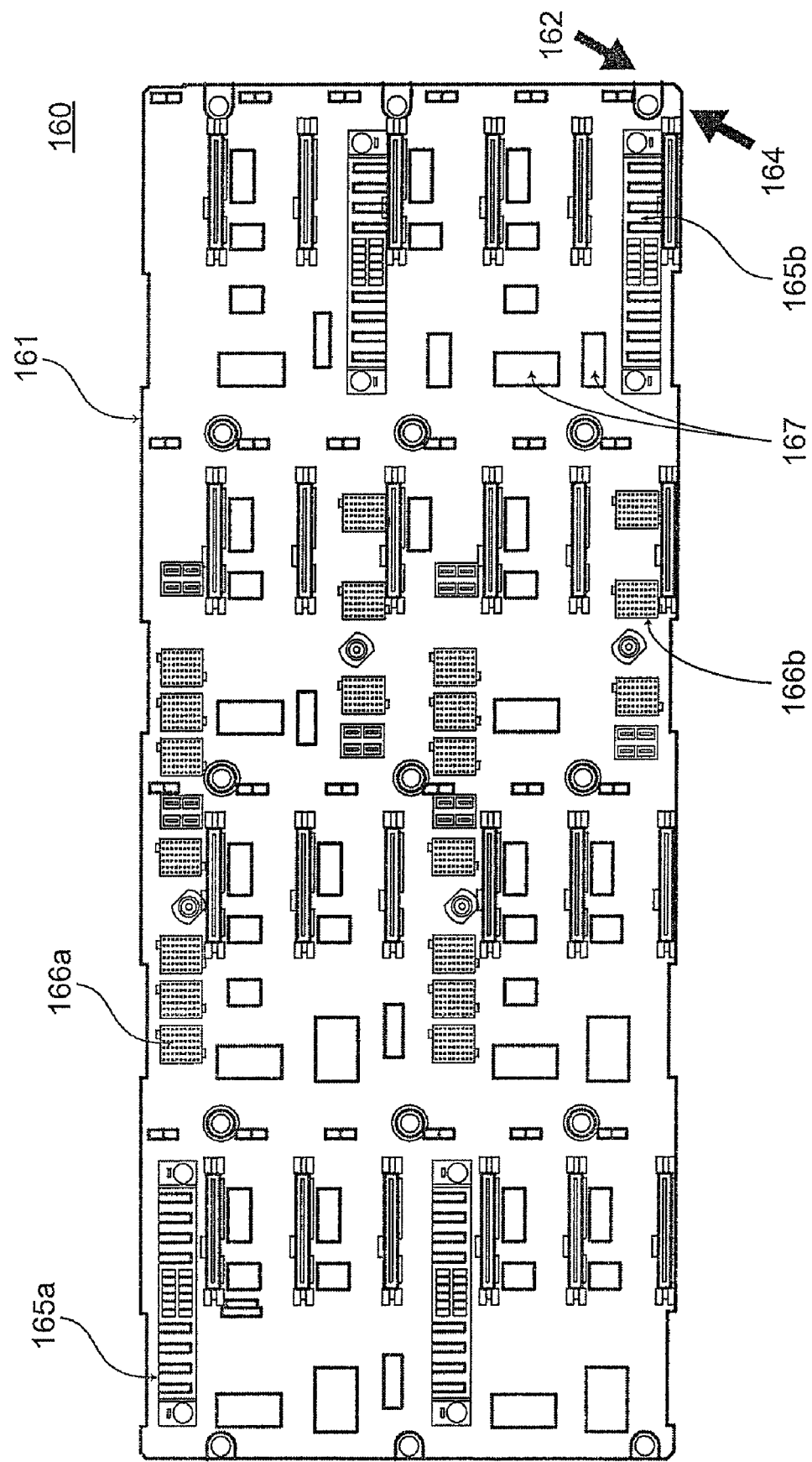
Figure 20:
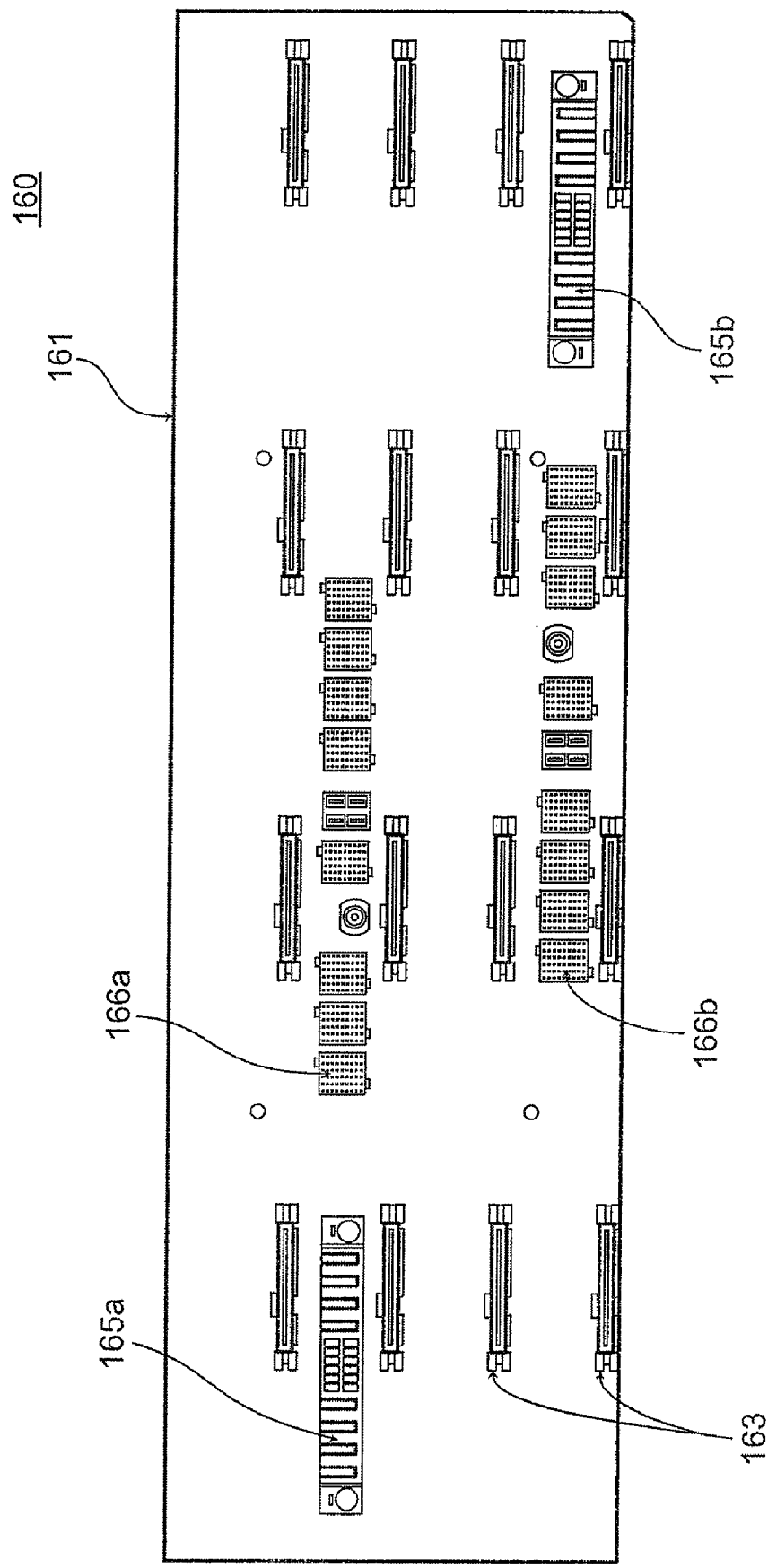
Figure 21:
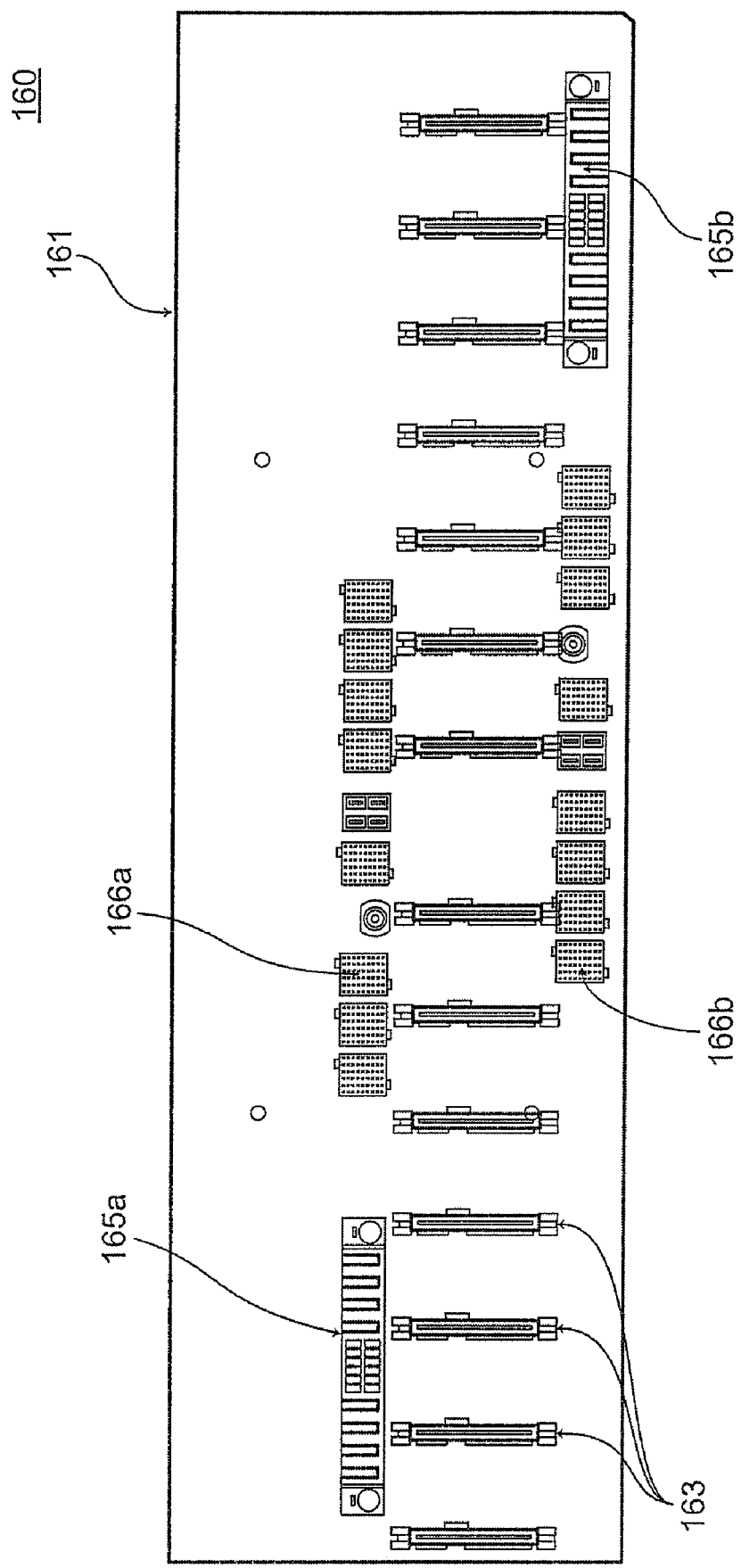
Figure 22:
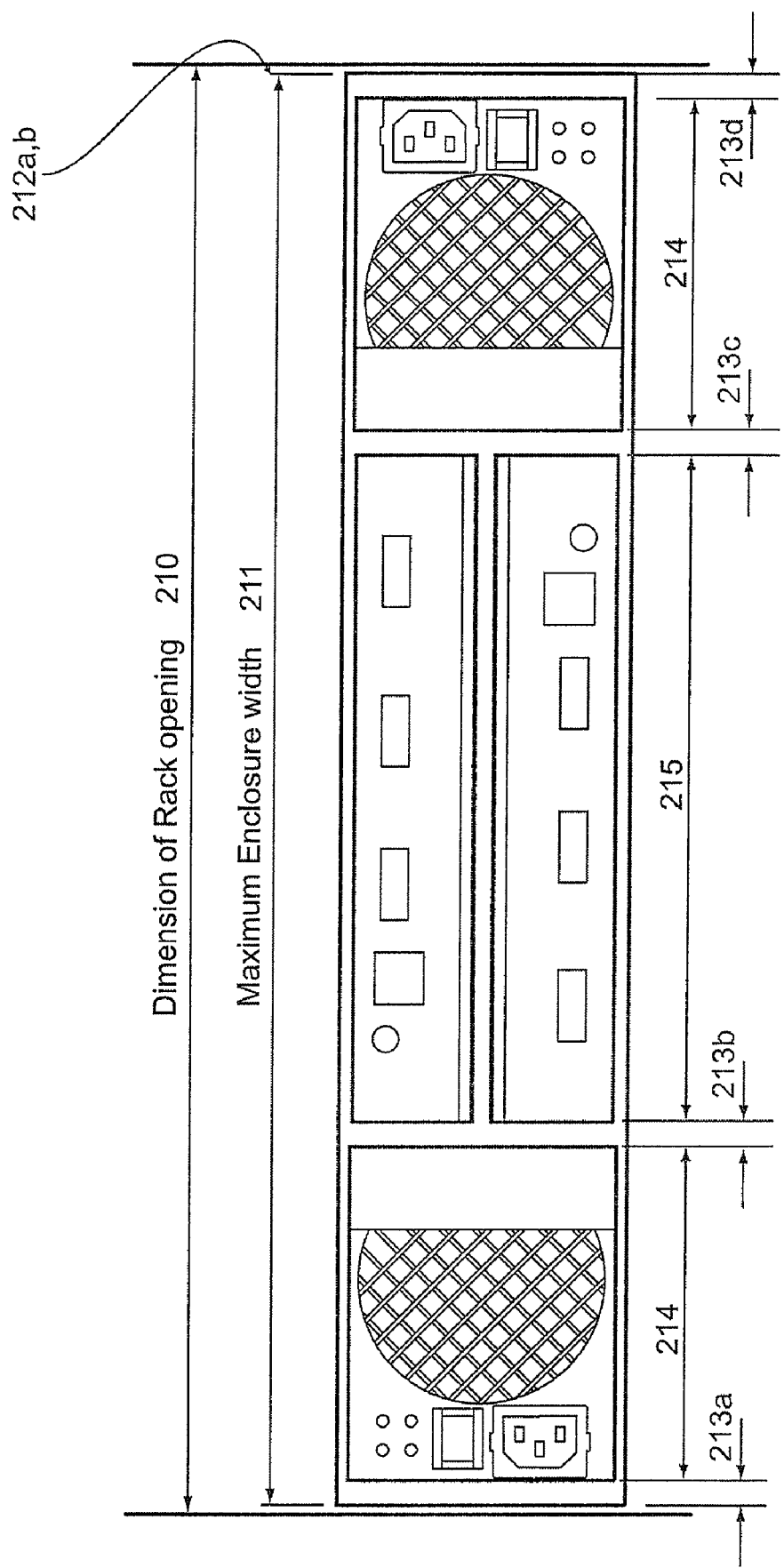

FIGS. 6a,6b,6c; 7a,7b,7c and 8a,8b,8c show views from the front, from above and from the rear of examples of 2 U storage enclosures in accordance with embodiments of the present invention;

FIGS. 9a,9b,9c; 10a,10b,10c and 11a,11b,11c show views from the front, from above and from the rear of examples of 4 U storage enclosures in accordance with embodiments of the present invention;

FIG. 12 shows a view from the rear of a further example of a 4 U storage enclosure in accordance with an embodiment of the present invention;

FIGS. 13a and 13b show views from above and from the rear of the air flow paths in the enclosure of FIGS. 6a,6b,6c; 7a,7b,7c and 8a,8b,8c;

FIGS. 14a and 14b show views from above and from the rear of the air flow paths in the enclosure of FIGS. 9a,9b,9c; 10a,10b,10c and 11a,11b,11c;

FIGS. 15a and 15b show views from the side and from the rear of the air flow paths in the enclosure of FIG. 12;

FIGS. 16 and 17 show examples of a midplane in accordance with an embodiment of the present invention shown in partial transparency; and, FIGS. 18a,18b,18c and 19a,19b,19c show views from the front, from above and from the rear of examples of 3 U storage enclosures in accordance with embodiments of the present invention;

FIGS. 20 and 21 show examples of a midplane in accordance with an embodiment of the present invention shown in partial transparency;

FIG. 22 shows from the rear an example of an enclosure and the modules of FIGS. 3, 5a and 5b in accordance with an embodiment of the present invention.

FIGS. 3, 4 and FIGS. 5a and 5b show an example of a power supply module 100, a cooling module 120 and an electronics module 130 in accordance with an embodiment of the present invention. FIGS. 6 to 12 show arrangements of modules in various storage enclosures 200.

FIG. 3 shows an example of power supply module 100 having a generally rectangular box-shape housing 101, including a front face 102, a rear face 103 and side faces 104,105,106,107. The rear face 103 of the power supply module 100 has a connector 108 for receiving electrical power from an external source. The rear face 103 may also have switches for controlling the state of the power supply module 100 and indicator LEDs (light emitting diodes) for showing the status of the power supply module 100. The power supply module 100 also has electrical components (not shown) within its housing 101 for converting power received from the power connector 108 into a form suitable to be used by the storage enclosure 200. The front face 102 of the power supply module 100 has a midplane connector 109 for connecting to a midplane of the storage enclosure 200, by which power can be supplied to the enclosure 200, and control signals exchanged with the enclosure 200.

The power supply module 100 has a first air inlet vent 110 in its front face 102 and a second air inlet vent 111 in a side face 104. The power supply module 100 has a fan 112 positioned within its housing 101 towards the rear face 103, and an air outlet vent 113 in the rear face 103. In use, the fan 112 draws air from the first and second air inlets 110,111, through the housing 101, thereby cooling the electrical components, and exhausts the air to the rear of the enclosure through the air outlet vent 113.

Figure 4:
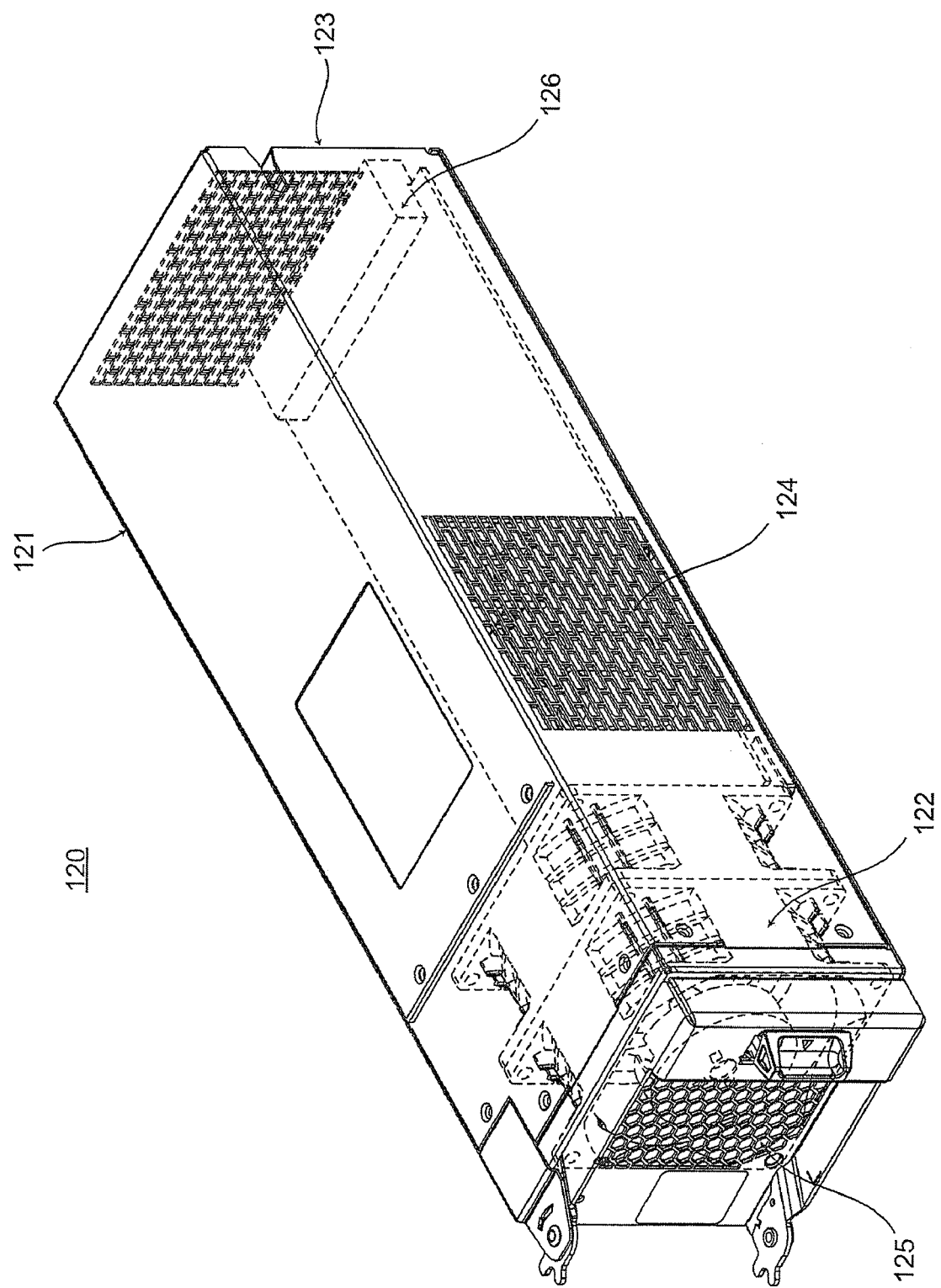
FIG. 4 shows an example of a cooling module in accordance with an embodiment of the present invention.

FIG. 4 shows an example of a cooling module 120. The cooling module 120 contains a fan or fans or some other air movement device 122. The cooling module 120 has a connector arranged 126 to receive power from midplane of the enclosure to power the fan. The cooling module 120 has the same form factor as the power supply module 100 of FIG. 3. In particular, the cooling module 120 has a housing 121 with the same dimensions as the power supply module 100 and similar arrangement of air inlet vents 123, 124 and air outlet vent 125, allowing the fan 122 to provide a similar cooling airflow as the power supply module 100.

As will be described in more detail below, the power supply module 100 and cooling module 120 have a width of w and a height of 2 h. Other form factors are possible, for example by having a width of any multiple of w and a height of any multiple of h. In particular, double aspect modules are contemplated, having a width of w and a height of 4 h.

FIGS. 5a and 5b show an example of an electronics module 130 having a rectangular box-shape housing 131, including a front face 132, a rear face 133, a top face 134, a bottom face 135 and side faces 136,137. The rear face 133 of the electronics module 130 has connectors 138 for connecting to and communicating with an external host computer or server. The rear face 133 may also have switches for controlling the state of the electronics module 130 and indicator LEDs (light emitting diodes) for showing the status of electronics module 130.

The electronics module 130 contains electronics (not explicitly shown) within its housing 131 for implementing particular functionality for the storage enclosure 200. For example, the electronics module 130 typically provides a controller for controlling the disk drive modules in the enclosure 200. The electronics module 130 may organise the disk drive assemblies as a JBOD (just a bunch of disks) or SBOD (switched bunch of disks) or EBOD (expander-based bunch of disks) and/or as a RAID array (redundant array of inexpensive disks). The front face 132 of the electronics module 100 has a midplane connector 139 (not shown in detail) for connecting to a midplane of a storage enclosure 200, by which power can be supplied from the enclosure 200, and data and control signals exchanged with the enclosure 200.

The electronics module 130 has an air inlet vent 140 in its front face 132. The electronics module 130 has a circuit board 141 within its housing 131 that is parallel to and positioned near to the bottom face 135 of the electronics module 130 and is attached to the midplane connector 139. The circuit board 141 contains electronic components (not specifically shown)

generally extending upwards into the upper portion of the electronics module 130. The electronics module 130 has a first air outlet vent 143 in the top face 134 and second and third air outlet vents 144a,144b in opposed side faces 136, 137. Thus air can be drawn into the electronics module 130 through air inlet 140, through the upper portion of the electronics module 130 thereby cooling the components, and out of one or more of the air outlet vents 143,144a,144b.

As will be described in more detail below, in this example the electronics modules have a width of 2 w and a height of h. Other form factors are possible, for example having any multiple of w and h. In particular, double aspect electronics modules are contemplated, having a width of 2 w and a height of 2 h. ("w" and "h" will be discussed further below.)

As will be described in the following, the modules 100, 120,130 of FIGS. 3, 4, 5a and 5b make possible a modular approach to storage enclosures. It should be noted that the terms "top", "bottom" and "side" used in relation to the modules 100,120,130 are arbitrary since the modules 100, 130 can be mounted in various orientations within the various enclosures 200.

Figure 7A:
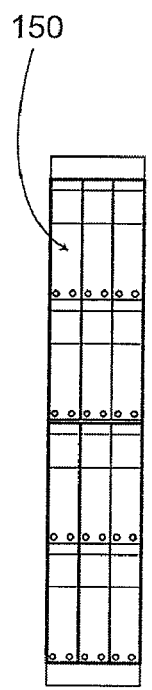
Figure 7B:
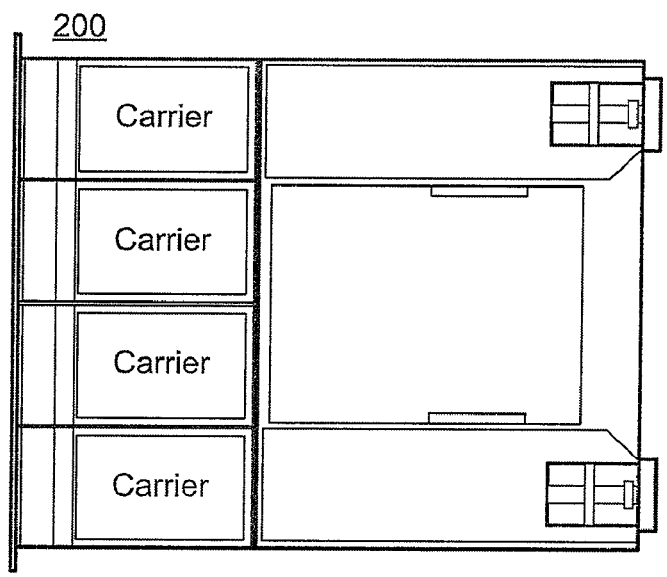
Figure 7C:
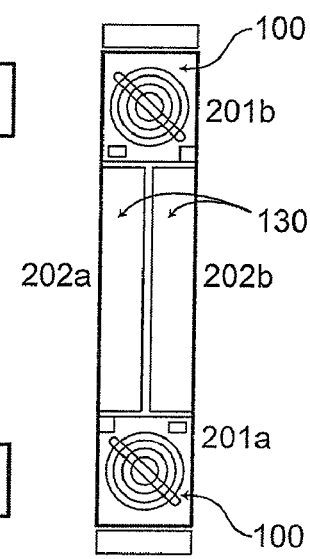
Figure 10A:
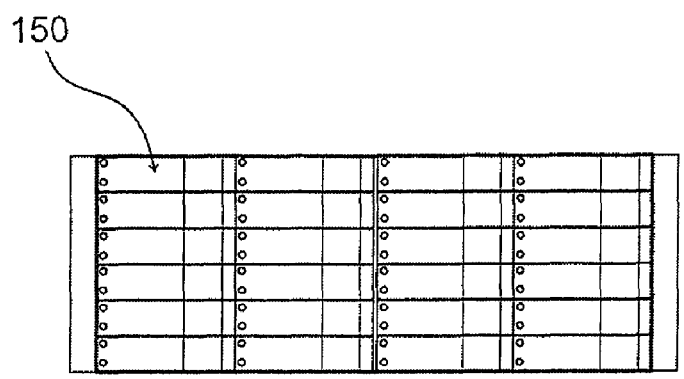
Figure 10B:
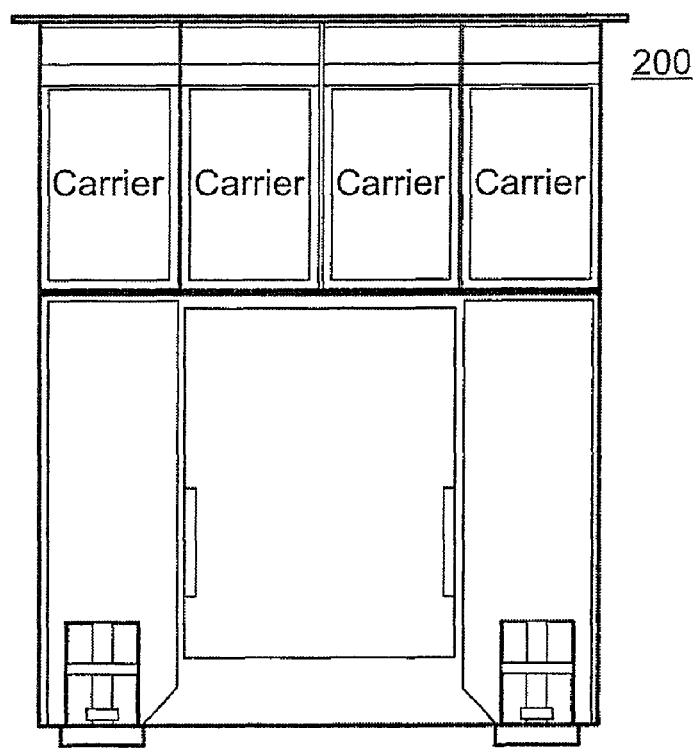
Figure 10C:
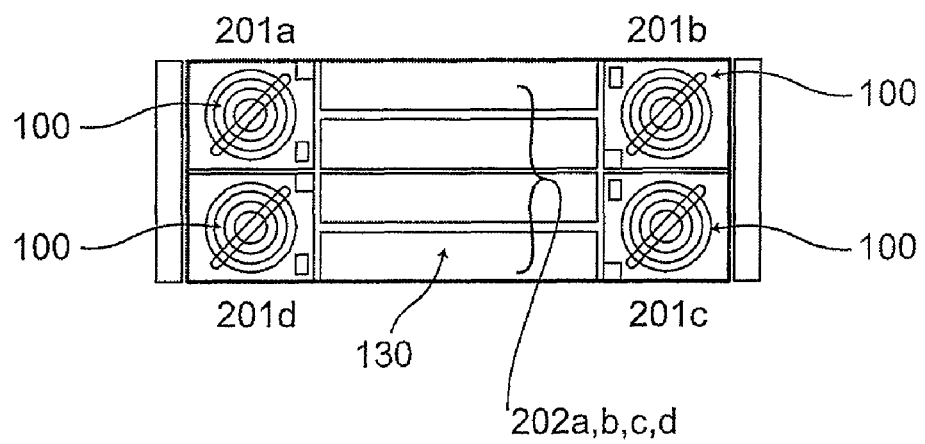
Figure 11A:
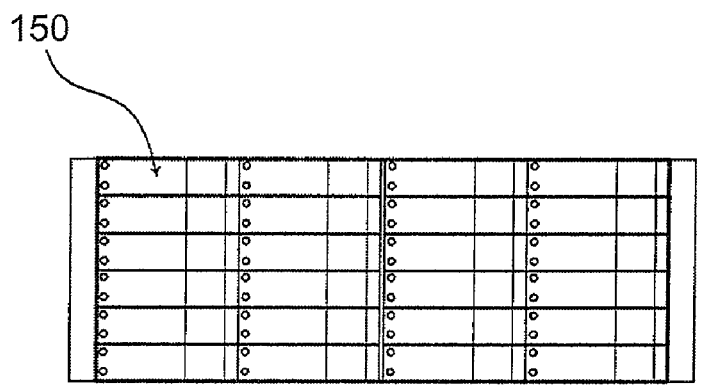
Figure 11B:
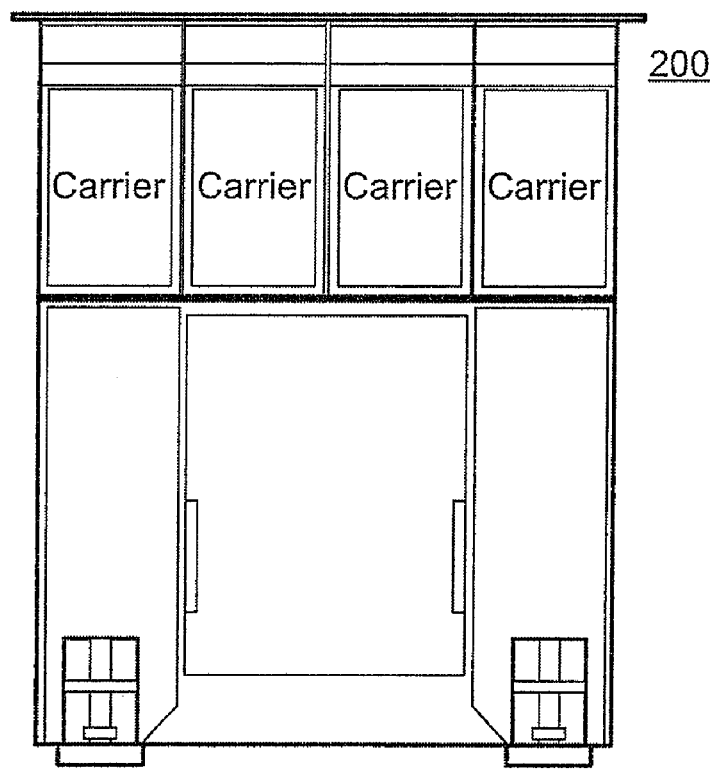
Figure 11C:
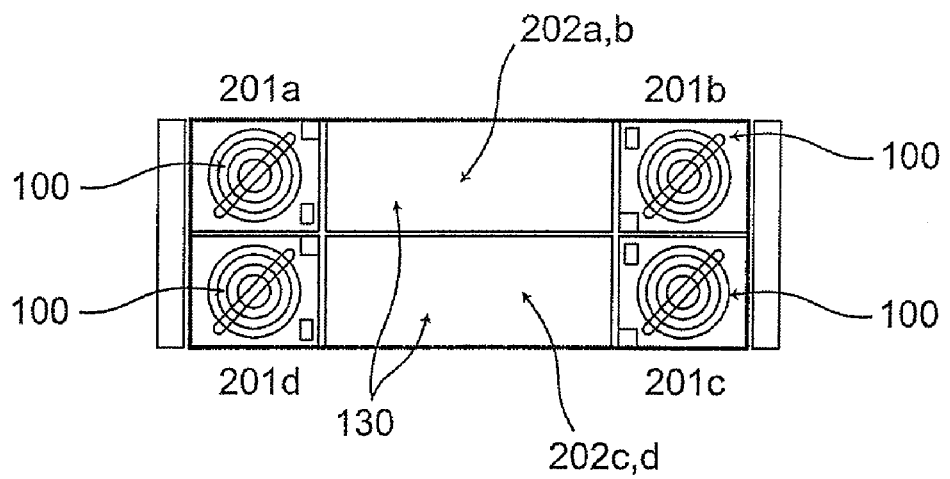

FIGS. 6 to 12 show various storage enclosures 200 incorporating various of the modules 100, 120, 130 described above in relation to FIGS. 3, 4, 5a and 5b as well as disk drive modules 150. Each enclosure 200 generally has a width designated by $W_E$ and a height designated by $H_E$. FIGS. 6, 7 and 7 show a 2 U storage enclosure 200, i.e. where $H_E$=2 U. FIGS. 9, 10 and 11 show a 4 U storage enclosure 200, i.e. where $H_E$=4 U. FIG. 12 shows a further example of a 4 U storage enclosure 200, i.e. where $H_E$=4 U. The width of each enclosure 200 of FIGS. 6 to 11 is appropriate to being mounted in a standard 19 inch (approx. 483 mm) rack, for example having a width of 450 mm.

Turning to the example of FIG. 6, as can be best seen from FIGS. 6A and 6B, at the front of the enclosure twelve 3.5 inch disk drive modules 150 are arranged in three rows of four. As can best be seen from FIGS. 6B and 6C, the rear of the enclosure 200 has two power supply bays 201a,b populated by power supply modules 100 at either side of the enclosure 200, and two electronics module bays 202a,b populated by electronics modules 130 between the power supply bays 201a,b, one 201a on top of the other 201b. The electronics modules 130 have a width of $W_E/2$ and a height of U, and the power supply modules 100 have a width of $W_E/4$ and a height of 2 U. The second power supply bay 201b is arranged to receive a power supply module 100 that is rotated at 180 degrees to the power supply module 100 of the first power supply bay 201a so as to be in effect the other way up second electronics module bay 202b is arranged to receive an electronics module 130 that is rotated at 180 degrees to the first electronics module 130 of the first electronics module bay 202a so as to be in effect the other way up. In this example, the first power supply bay 201a has a power supply with a fan and the second PSU bay has a cooling module 120.

FIG. 7 shows a similar enclosure 200 to that shown in FIG. 6, except that this example of the enclosure 200 has two power supply modules 100 in the power supply bays 201a,b, to allow more power to be supplied and/or redundancy in power supply.

Figure 8A:
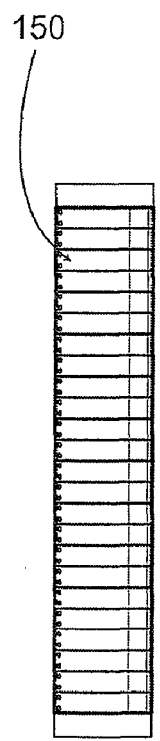
Figure 8B:
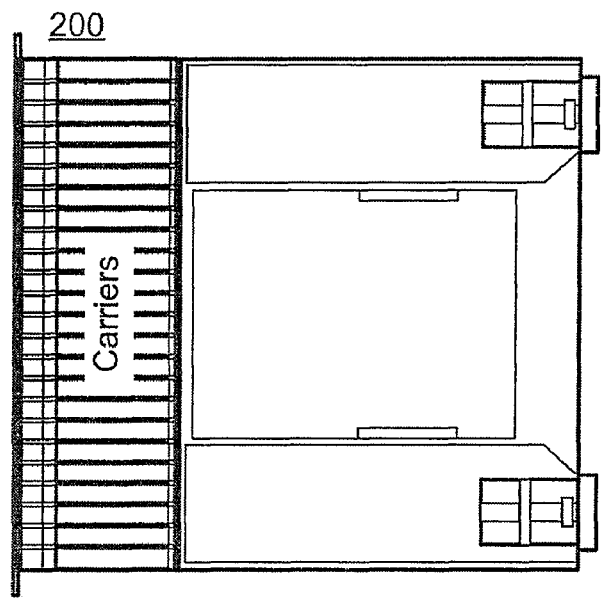
Figure 8C:
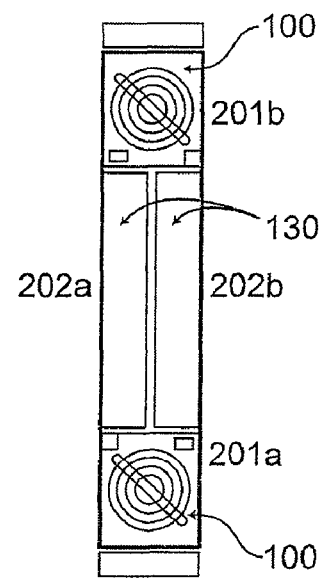

FIG. 8 shows a similar enclosure 200 to that shown in FIG. 7, except that this example of the enclosure 200 has 24 2.5 inch disk drives modules 150 in a row in the front of the enclosure 200.

Turning to FIG. 9, the 4 U enclosure 200 has rear module bays 201, 202 in a similar layout to the 2 U enclosure 200, but in two banks 203, 204 positioned one above the other. The enclosure 200 also has twice as many 3.5 inch disk drive modules 150 in the front, i.e. 24 in six rows of four each. The rear module bays 201, 202 contain two power supply modules 100 in bays 201b,d. The two other power supply bays 201a,c are empty in this example and sealed off by blanks 205. Similarly, two of the electronics modules bays 202a,c are populated with electronics modules 130. The other two electronics module bays 202b,d are empty and sealed off with blanks 206.

As will be apparent to those skilled in the art, other arrangements of modules 100, 130 are possible within this enclosure architecture 200. For example, the enclosure 200 of FIG. 10 shows a similar enclosure 200 to FIG. 9 fully populated with power supply modules 100 and electronics modules 130. The electronics modules 130 and power supply modules 100 may have different power supply and power sinking capacities. These may vary according to the height of the modules. For example, a double height electronics module 130 may have a higher power rating that a single height electronics modules. A double height or triple height power supply module 100 may be capable of supplying more power to the enclosure 200.

It is also contemplated to provide "double aspect" modules 100,130 that can be accommodated within the enclosure 200. For example, in FIG. 11 shows a similar enclosure to FIG. 9 having two double aspect electronics modules 130 occupying the respective side bays 202a,b; 202c,d. Similarly, double aspect power supply modules 100 could also be used.

FIG. 12 shows a 4 U enclosure 200 of a so-called "drawer" type. In this enclosure 200, the disk drive modules 150 are not accessible from the front face of the enclosure 200; the enclosure 200 must be drawn forward from the rack to access the disk drive modules 150 from above. The rear of the enclosure 200 has two electronics bays 202a,b side by side at the bottom of the rear face, each having dimensions of $W_E/2$ width and U height. Above the electronics module bays 202a,b are four power supply bays 201a,b,c,d. Each power supply bay 201a, b,c,d is 2 U wide and $W_E/4$ high. Thus the enclosure 200 of FIG. 12 has power supply modules 100 turned through 90 degrees in comparison to the power supply modules 100 shown in FIGS. 6 to 11. In contrast to the enclosures of FIGS. 6. to 11, the enclosure 200 of FIG. 12 has no vertical midplane between the disk drive assemblies 150 and the rear module bays 201,202 to which the rear modules 100,130 connect. Instead the main circuit board (not shown) of the enclosure 200 is horizontal and positioned underneath the disk drive assemblies 150, and has connectors thereon so that the disk drive assemblies 150 can connect to the circuit board. Connectors for the rear modules 100,130 may be attached to suitable structure of the enclosure housing positioned for connecting to the rear modules 100,130. These connectors may be connected to the circuit board by ribbon cable or any other suitable connection.

As can be seen from the preceding examples, the preferred modules in effect have a common form factor, or integer multiples thereof in height or width or both, and are thus capable of a wide range of configurations within storage enclosures, and make a efficient and flexible use of the available space in various storage enclosure 200 layouts, whilst aiding scalability. This is advantageous to the manufacturer, who can maintain a common set of modules 100,120,130 and can select as appropriate from the modules 100,120,130 when designing new enclosures 200 according to the required functionality of the enclosure 200. Flexibility is also provided, since the manufacturer can select for example power supply modules 100 having different power ratings for different enclosures 200 and different electronics modules 130. Power supply redundancy can also be provided in this way. Electronics modules 130 can also be maintained that provide different common storage enclosure functionality such as RAID functionality or JBOD functionality. In this way redesign effort is saved each time a manufacturer wants to produce a new storage enclosure 200.

This is also advantageous to end users, who may have many different storage enclosures 200 in their organisation. The common form factor of the preferred modules 100,120,130 allows modules to be more easily interchanged between enclosures 200. This allows the end use to maintain fewer spare modules for replacing failed modules in their storage enclosures 200, since for example, one spare power supply module 100 can be kept to replaced a failed power supply module 100 in any of their storage enclosures 200. This invention aids compatibility of modules 100,120,130 between enclosures 200 of different manufacturers as well as the same manufacturer.

The internal arrangement of these enclosures will now be discussed with reference to FIGS. 13 to 17.

FIG. 13 shows the cooling arrangement of the 2 U enclosure 200 of FIG. 8. As can be seen, the second air inlets 111 of each power supply module 100 are orientated "inwards" so as to face towards the adjacent electronics modules 130. In this position, the air inlets 111 are each in alignment with the respective air outlet 143 of the electronics modules 130 so that air can flow between them. In operation, the fans 112 of the power supply modules 100 draw cooling air from the front of the enclosure 200 across the drives, thereby cooling them. The air passes around the midplane or through apertures in the midplane (as will be described in more detail later) and separates into two streams. The first stream passes through the first air inlet 110 of each power supply 100. The second stream passes through the air inlet 140, through the electronics modules 130 and into the power supply modules 130 through the second air outlet vent 143 of the electronics modules 130 and through the second air inlet 111 of the power supply modules 100. The reverse orientation of the electronics modules 130 creates a large plenum for air between the circuit boards 141 of the electronics modules 130, and thus allow the components on the circuit boards 141 to be cooled. The two air streams converge in the power supply unit 100 before being vented to the rear of the enclosure 200 by the fan 112 through the power supply air outlet 113.

FIG. 14 shows the cooling arrangement in the 4 U enclosure 200 of FIG. 10. This arrangement is in effect similar to that of FIG. 13 except that it is repeated for each bank of modules.

FIG. 15 shows the cooling arrangement in the 4 U enclosure 200 of FIG. 12. Here again, the orientation of the power supply modules 130 is such that the second air inlet 111 of each faces the electronics modules 130. Again the fans draw air in through the front of the enclosure 200 and across the disk drive units 150, thereby cooling them. The air then separates into two streams. The first stream enters the power supply units 100 through their respective first inlets 110 and cools the power supply components. The second stream enters the electronics modules 130 through their respective air inlets 140 and cools the electronic components. The air exits the electronics modules 130 through their respective second air outlets 144 and passes into the power supply units 100 via their second air inlets 111. The two air streams converge in the power supply unit 100 before being vented to the rear of the enclosure 200 by fan through the power supply air outlet 113.

The cooling arrangement described above is similar when a fan module 120 is present in the enclosure 200 in the place of a power supply module 100, with the fan of the fan module 120 taking the place of the fan of the power supply module 100 in drawing air through the enclosure 200 along similar cooling paths.

FIG. 16 shows an example of a midplane 160 that is particularly useful in the enclosure 200 of FIG. 8. The midplane 160 comprises a circuit board 161 having a first surface 162 holding front connectors 163 for connecting to the disk drive modules 150, and a second surface 164 for holding rear connectors 165,166 for connecting to the rear modules. In this example, the rear connectors 165,166 comprise two power supply connectors 165a,b and two electronics module connectors 166a,b for connecting respectively to the two power supply modules 100 and the two electronics modules 130 described above in relation to FIG. 8. It should be noted that the power supply connectors 165a,b also include a connector part capable of connecting to the cooling modules 120 that may be alternatively positioned in one or more of the power supply bays 201a,b, for example as described above in relation to FIG. 6.

The first power supply connector 165a and the first electronics module connector 166a are each positioned above the disk drive connectors 163 near the top edge of the midplane circuit board 161. The second power supply connector 165b and the second electronics module connector 166b are each positioned below the disk drive connectors 163 near the bottom edge of the midplane circuit board 161. The second connectors 165b,166b are orientated at 180 degrees to the first connectors 165a,166a to allow the orientation of the respective modules as described above.

This arrangement provides several advantages. The arrangement of the electronics module connectors 166 allows the electronics modules 130 to be arranged as described above so that their main circuit boards 139 are close to the outside of the enclosure 200, so as to form a larger plenum for cooling air flow between the two circuit boards to assist in cooling.

Also, the arrangement of the power supply connectors 165 allows the power supply modules 130 to be arranged as described above, so as the air inlet 111 in each power supply module 100 faces the respective electronics modules 130, assisting in creating a cooling airflow in the enclosure 200.

The arrangement of the rear connectors 165,166 also provides that the rear connectors 165, 166 are positioned near the opposed edges of the midplane circuit board 161. In addition, first power supply connector 165a and the first electronics module connector 166a are vertically aligned and longitudinally extend horizontally so as to have the smallest footprint when viewed from the side, as are the second connectors 165b,166b. This leaves the maximum circuit board area between the sets of rear connectors 165,166, which that can be used for disk drive connectors 163. This helps avoid connectors from having to overlap, i.e. conflict, with each other on their opposite sides 162,164 of the circuit board 161.

Avoiding conflicts of this sort between connectors 163, 165, 166 helps simplify manufacture of the midplane 160. This is because where connectors do conflict, it is normally necessary to employ so-called "blind vias" in the circuit board 161 to deal with the conflicts. These are difficult to manufacture simply and usually force the circuit board 161 to be manufactured as multiple boards which are later laminated together. This tends to increase the time required and complexity of the manufacturing process of the midplane 160 and leads to increased cost of manufacturing. The arrangement of FIG. 16 helps to avoid such conflict and the associated disadvantages in manufacturing the midplane 160.

FIG. 17 shows an example of a midplane 160 that is particularly useful in a 4 U enclosure as for example shown in FIGS. 9 to 11. The orientation of the disk drive connectors 163 is different from the midplane of FIG. 16 to reflect the layout of the disk drive modules 150. The midplane 160 has apertures 167 to allow cooling air to pass from the front to the back of the enclosure 200. The layout of the power supply connectors 165a,b and electronics modules connectors 166a,b is similar to those of the midplane 160 of FIG. 16, except of course the pattern is repeated to reflect the two banks 203,204 of rear modules. Thus again, the orientation of the rear connectors 165, 166 allows a large space to be available for the positioning of the disk drive connectors 163. In this example the disk drive connectors 163 longitudinally extend horizontally. The horizontal positioning of the rear connectors 165,166 means that they can easily fit in between the horizontal disk drive connectors 163. Thus again conflicts between overlapping front and rear connectors 163,165,166 can be more easily avoided.

The 2 U enclosure 200 shown in FIGS. 6 and 7 may have a midplane 160 that is effectively one half of the midplane 160 of FIG. 17. As will be appreciated, this arrangement and its advantages can be extended to any enclosure 200 having a height that is an integer multiple of 2 U by appropriately repeating the midplane layout of one half of the midplane 160 of FIG. 17 and corresponding module layout.

Figure 18A:
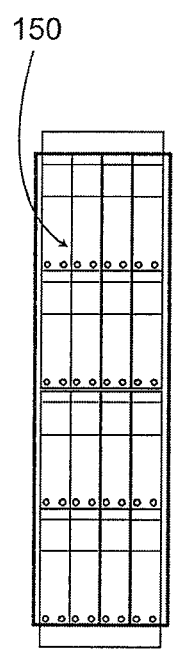
Figure 18B:
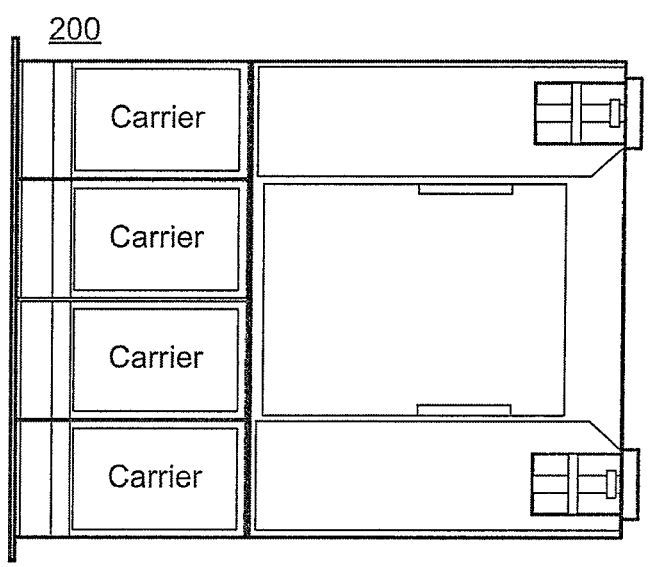
Figure 18C:
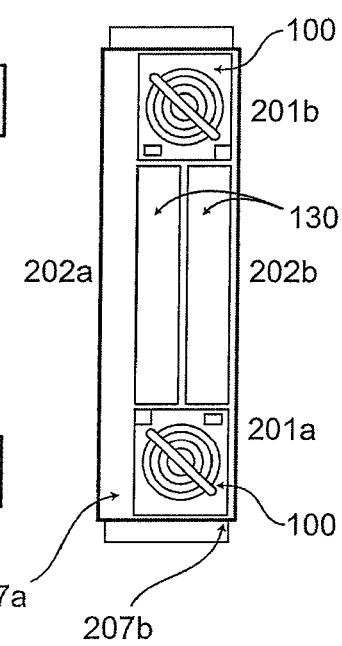
Figure 19A:
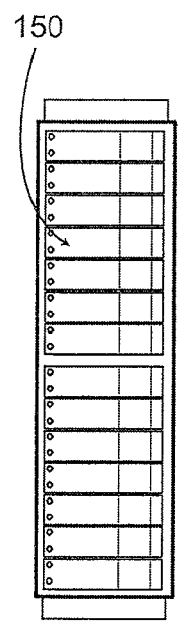
Figure 19B:
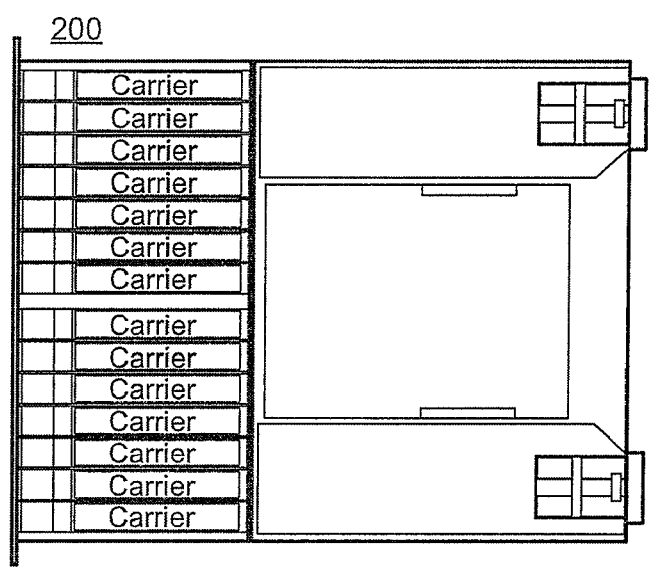
Figure 19C:
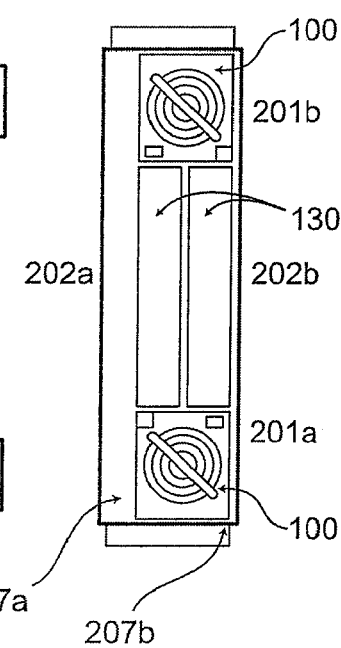

It is also contemplated to provide a 3 U enclosure 200 for use with the modules 100,120,130. FIG. 18 shows a 3 U enclosure 200 having sixteen 3.5 inch disk drives arranged in four rows of four each FIG. 19 shows a 3 U enclosure 200 having fourteen 3.5 inch disk drives arranged in sideways in a row. In each case, the arrangement of modules 100,120,130 at the rear of the enclosure 200 is similar in layout to the 2 U enclosure 200 of FIGS. 6 to 8. As can best be seen from FIGS. 18c and 19c, this arrangement means that there is some space 207a,207b at the rear of the enclosure 200 above and below the modules that is not taken up by the modules. This space 207a,207b can optimally be used inside the enclosure housing to provide additional cooling airflow paths.

FIGS. 20 and 21 show 3 U midplanes 160 that are particularly useful in the 3 U enclosures of FIGS. 18 and 19 respectively. The 3 U midplane 160 of FIG. 20 has a generally similar layout of connectors to the 4 U midplane 160 of FIG. 17 and the 3 U midplane 160 of FIG. 21 has a generally similar layout of connectors to the 2 U midplane 160 of FIG. 16.

Although in the description so far the preferred dimensions of the power supply and electronics modules 100,130 have been given in terms of the dimensions of the enclosure 200, clearly some latitude must be given to allow for tolerances, sufficient clearances between the modules and the enclosure walls to allow the modules to be removed, and the thickness of the walls that form the enclosure and partition the bays of the enclosure. The actual dimensions of the modules 100,130 will therefore be smaller than the notional dimensions described so far in terms of the width and height of the enclosure. It is considered that the actual physical dimensions may be up to 5% less than the notional dimensions.

A detailed example will now be made referring to FIG. 22 which shows a 2 U enclosure within a rack.

FIG. 22 shows in detail the modules 100,130 of FIGS. 3, 5a and 5b in position within the storage enclosure 200 of FIG. 7, as shown from the rear of the enclosure 200. The enclosure 200 is mountable in a 19 inch rack. The rack has a nominal opening 210 of 450 mm. Allowing for tolerances and clearance 212a,b, the maximum width 211 of the enclosure 200 is therefore limited to be 447 mm. The enclosure 200 comprises a housing 201 made from sheet metal or other suitable material including walls 213a,b,c,d to partition the enclosure into bays 201,202 for receiving modules 100,130, and walls for mounting to the rack. Thus, it will be appreciated that not all of the 447 mm of enclosure width can be taken up by the width of the modules 100,130 themselves, and that some of this 447 mm will be taken up by the walls of the housing and partitions and by clearances between the modules and the bays.

Electronics Module Width

The width of the electronics module 130 is limited by the requirement to allow two electronics modules 130 to fit side by side in the enclosure 200, as in the example of FIG. 12. This limits the width of the electronics module 130 to be less than half of the width of the enclosure 200 of 447 mm, giving a notional width of 223.5 mm.

Practical minimum values for the width of the walls of the enclosure and clearances between modules and walls would be 1 mm for the walls and 0.5 mm for the clearances. Allowing for these values for the walls and clearances, the absolute maximum width of the electronics module 130 would be:

447 mm−(3×1 mm) [walls]−(4×0.5 mm) [clearance]/ 2=221 mm.

A preferred enclosure 200 has 7 mm of walls at either side of the enclosure 200 and 9 mm of central walls to partition the electronics bays, with 1 mm clearance between each side of each electronics module 130 and the adjacent walls of the enclosure 200. This gives rise to electronics modules 130 having a preferred maximum width of:

447 mm−(2×7 mm) [side walls]−9 mm [central walls]−(4×1 mm) [clearance]/2=210 mm.

Electronics Module Height

The range of dimensions for the electronics module 130 height are limited by the requirement to allow two electronics modules 130 to fit one above the other in a 2 U enclosure 200, as for example in FIGS. 6 to 8 and FIG. 22. This limits the height of the electronics module 130 to be less than half of the height of the 2 U enclosure 200 of 89 mm, giving a notional height of 44.5 mm.

Allowing minimum values for walls and clearances, the absolute maximum height of the electronics module 130 would be:

89 mm−(3×1 mm) [walls]−(4×0.5 mm) [clearance]/ 2=42 mm.

A preferred enclosure 200 has a 1.5 mm rack rail, 1 mm of walls at the top and bottom, 5 mm of central walls and 1 mm of clearance between the top and bottom of each electronics module 130 and the adjacent walls. A rack rail is included as the enclosure 200 may sit on a rail within the rack. This height is outside of the enclosure 200 but must be allowed for to ensure that the enclosure 200 fits within the U height of the rack. Enclosures 200 that use slides to move in and out of the rack do not require this height allowance, but will instead require more space at either side of the enclosure to accommodate the slide mechanism. This gives rise to electronics modules 130 having a preferred maximum height of:

89 mm−1.5 mm [rail]−(2×1 mm) [side walls]−5 mm[centre walls]−(4×1 mm) [clearance]/2=38 mm.

Power Supply Module Width

The width of the power supply module 100 is limited by:
1) The requirement to fit two power supply modules 100 and an electronics module 130 alongside each other in an enclosure 200, as shown in FIGS. 6 to 8.

2) The requirement, to fit a power supply module 100 when rotated through 90 degrees and an electronics module 130 in the height of a 4 U enclosure 200, as shown in FIG. 12.
3) The requirement to fit two power supply modules 100 in no more than the width of one electronics module 130.

Requirement 1 gives a maximum of:

447 mm−221 mm [max width of electronics module]−(4×1 mm) [walls]−(6×0.5 mm) [clearance]/2=109.5 mm.

Requirement 2 gives a maximum of:

178 mm [4 U]−42 mm [max height of electronics module]−(3×1 mm) [walls]−(4×0.5 mm) [clearance]=131 mm.

Requirement 3 gives a maximum of:

221 mm [max width of electronics module]−1 mm [walls]−(2×0.5 mm) [clearance]/2=109.5 mm.

Thus the maximum width of a power supply module 100 is 109.5 mm.

For a preferred enclosure 200, two power supply modules 100 fit into the space of one electronics module 130. Using the preferred width of electronics module of 210 mm, requirement 1 gives the maximum preferred width of a power supply module 100 as:

447 mm−210 mm [preferred width of electronics module]−(2×7 mm) [side walls]−2×4 mm [inner walls]−6×1 mm [clearance]/2=104.5 mm Similarly the maximum width of a cooling module 120 is 109.5 mm and the maximum preferred width of a cooling module 120 is 104.5 mm.

Power Supply Module Height

The height of the power supply module 100 is limited by:
1) The requirement to fit a power supply module in the height of a 2 U enclosure 200, as shown in FIGS. 6 to 8.
2) The requirement to fit 4 power supply modules 100 in the width of a 4 U enclosure 200, as shown in FIG. 11.

Requirement 1 determines the maximum height in this case. To fit in a 2 U height of 89 mm the maximum height of the power supply module 100 is:

89 mm [2 U]−(2×1 mm) [walls]−(2×0.5 mm) [clearance]=86 mm.

A preferred enclosure 200 has a 1.5 mm rack rail, 1 mm of walls at the top and bottom and 1 mm of clearance between the top and bottom of the power supply module 100 and the adjacent walls. This gives rise to power supply modules 100 having a maximum preferred height of:

89 mm [2 U]−1.5 mm [rail]−2×1 mm [top/bottom walls]−(2×1 mm) [clearance]=83.5 mm Similarly the maximum height of the cooling module 120 is 86 mm and the preferred maximum height of the cooling module 120 is 83.5 mm.

SUMMARY

Table 1 shows a summary of the preferred and maximum dimensions of the power supply and electronics modules 100, 130.

It is contemplated that the preferred maximum values for the modules are implemented to within a tolerance of ±2 mm.

TABLE 1

| Module | Preferred Height | Maximum Height | Preferred Width | Maximum Width |
| --- | --- | --- | --- | --- |
| Electronics | 38 ± 2 mm | 42 mm | 210 ± 2 mm | 221 mm |
| Power Supply | 83.5 ± 2 mm | 86 mm | 104.5 ± 2 mm | 109.5 mm |

The values given above for the dimensions of the modules 100,130 are maximum values. The dimensions do not effectively have strict minimum values, since there is no constraint on making modules smaller apart from less efficient use of space in the enclosure 200. Smaller modules just allow increased space for walls and clearances, or allow more modules to be installed.

The bays 201,202 for receiving the modules 100,130 will have maximum dimensions that are 1 mm larger than the maximum dimensions of the module they receive to allow for 0.5 mm clearance at each side, and preferred dimensions that are 2 mm larger than the preferred dimensions of the module they receive to allow for 1 mm clearance at each side.

The power available from the power supply modules 100 is arranged so that it can supply power in the worst case of any of the planned installations, i.e. the largest demand on power. This allows a single customer field replaceable unit (FRU) to be used across the entire product range.

The cooling capability from the power supply module 100 or cooling module 120 is arranged so that it covers the worst case of any of the planned installations. This allows a single customer field replaceable unit (FRU) to be used across the entire product range.

The system components described so far provide the modular basis for use in multiple enclosures 200. Their use is not limited to singular use and double height or double width modules could be used for specific applications where appropriate. Examples of this are a double height electronics module 130 to allow greater board space and functionality. This could fit in place of 2 modules in either the 2 U or 4 U enclosures 200. A double height power supply module 100 may also be used. This could be used in the 4 U enclosure 200 to reduce the power density of the power supply module 100 for a cost sensitive, high volume application.

Thus a set of modules 100,120,130 are provided that are capable of being deployed in commonly sized enclosures 200 to provide a wide range of functionality to the enclosure 200. The modules 100,120,130 are sized to be capable of assuming a number of arrangements of position and orientation in the enclosure 200 and to make efficient use of the space available in each. Each arrangement of modules 100,120,130 also provides cooling of the enclosure 200. The arrangements also avoid conflicts on the midplane 160 with disk drive connectors in conjunction with the disk drives 150 being arranged in various common layouts. Thus the designer of an enclosure 200, once the number of disk drives and height of the enclosure 200 has been decided upon, can simply pick modules from the set of modules to implement the desired functionality for that enclosure 200 and can implement them in the enclosure 200 with no redesign of modules 100,120,130 being necessary for fit within the enclosure 200, for providing adequate cooling or power, or to avoid conflict with disk drive connectors on the midplane 160.

Embodiments of the present invention have been described with particular reference to the examples illustrated. However, it will be appreciated that variations and modifications may be made to the examples described within the scope of the present invention.

The invention claimed is:

1. A data storage device enclosure for housing one or more data storage devices, the enclosure having housed therein a plurality of modules, at least one of the modules being a power supply module and at least one of the modules being an electronics module, wherein each module has a first dimension of substantially n*w and a second dimension of substantially m*h, where n and m are integers that may be different for each module, wherein w=(the width of the enclosure $W_E$/an integer between 1 and 6 inclusive) and h=(the height of the enclosure $H_E$/ an integer), w, h, $W_E$ and $H_E$ each being measured in the same plane, wherein the first dimension of said electronics module is twice the first dimension of said power supply module.

2. An enclosure according to claim 1, wherein the power supply module is positioned adjacent the electronics module and is arranged to draw cooling air through the electronics module.

3. An enclosure according to claim 1, the enclosure having a midplane, wherein the at least one power supply module comprises:
   a box-like housing having opposed first and second end faces and four side faces, the first end face having a connector for connecting to the midplane such that the second end face is accessible externally of the enclosure when positioned in the enclosure;
   a first air inlet provided in the first end face;
   a second air inlet provided in a side face;
   an air outlet provided in the second end face; and,
   a fan positioned adjacent the air outlet arranged so as to draw in air through the first and second air inlets, through the housing, and to vent the air through the air outlet.

4. An enclosure according to claim 1, wherein the enclosure has a height of 2 U and width of $W_E$ and comprises: a first bay and a second bay each having a width of $W_E$/4 and a height of 2 U for receiving respective first and second power supply units, the power supply bays being at either side of the enclosure; and, a first bay and a second bay each having a width of $W_E$/2 and a height of U for receiving respective first and second electronics modules, the electronics module bays being positioned one on top of the other and between the power supply bays.

5. An enclosure according to claim 1, wherein the enclosure has a height of 3 U and width of $W_E$ and comprises: a first bay and a second bay each having a width of $W_E$/4 and a height of 2 U for receiving respective first and second power supply units, the power supply bays being at either side of the enclosure; and, a first bay and a second bay each having a width of $W_E$/2 and a height of U for receiving respective first and second electronics modules, the electronics module bays being positioned one on top of the other and between the power supply bays so as to be within an envelope having a width of $W_E$ and a height of 2 U.

6. An enclosure according to claim 1, wherein the enclosure has a height of 4 U and width of $W_E$ and comprises: a first bank and a second bank of bays, each bank having a height of 2 U and a width of $W_E$ positioned one on top of the other, each bank having a first bay and a second bay each having a width of $W_E$/4 and a height of 2 U for receiving respective first and second of said power supply units, the power supply bays being at either side of the enclosure; and, a first bay and a second bay each having a width of $W_E$/2 and a height of U for receiving respective first and second of said electronics modules, the electronics module bays being positioned one on top of the other and between the power supply bays.

7. An enclosure according to claim 4, wherein the first and second power supply bays are arranged such that the position and orientation of the first power supply module is a 180 degrees rotation of the position and orientation of the second power supply module about an axis perpendicular to said plane of measurement.

8. An enclosure according to claim 7, the enclosure having a midplane, wherein the plurality of modules includes at least two power supply modules each comprising:
   a box-like housing having opposed first and second end faces and four side faces, the first end face having a connector for connecting to the midplane such that the second end face is accessible externally of the enclosure when positioned in the enclosure;
   a first air inlet provided in the first end face;
   a second air inlet provided in a side face;
   an air outlet provided in the second end face; and,
   a fan positioned adjacent the air outlet arranged so as to draw in air through the first and second air inlets, through the housing, and to vent the air through the air outlet;
   wherein each power supply module is positioned and orientated so that each of said respective second air inlets faces inwards towards its adjacent electronics module, so that each of said respective fans draws air through its adjacent electronics module bay in use.

9. An enclosure and a plurality of modules according to claim 4, wherein the first and second electronics module bays are arranged such that the position and orientation of the first electronics module is a 180 degrees rotation of the position and orientation of the second electronics module about an axis perpendicular to said plane of measurement.

10. An enclosure according to claim 1, wherein the enclosure has a height of 4 U and width of $W_E$ and comprises: a first bay, a second bay, a third bay and a fourth bay each having a width of 2 U and a height of $W_E$/4 for receiving respective first, second, third and fourth power supply units, the power supply bays being adjacent each other so as to be within an envelope having a width of 8 U and a height of $W_E$/4; and, a first bay and a second bay each having a width $W_E$/2 and a height of U for receiving respective first and second electronics modules, the electronics module bays being positioned adjacent each other so as to be within an envelope having a width of $W_E$ and a height of U.

11. An enclosure according to claim 1, wherein the enclosure has a plurality of adjacent bays having the same width and height that are capable of receiving a corresponding number of individual modules or a single module having a correspondingly greater value of n or m.

12. An enclosure according to claim 1, comprising at least one cooling module, wherein the enclosure can accept the cooling module in place of at least one power supply module.

13. An enclosure according to claim 1, wherein w is between about 102.5 mm and about 109.5 mm.

14. An enclosure according to claim 1, wherein h is between about 36 mm and about 42 mm.

15. A data storage device enclosure for housing one or more data storage devices, the enclosure having housed therein a plurality of modules, at least one of the modules being a power supply module and at least one of the modules being an electronics module, wherein each module has a first dimension of substantially n*w and a second dimension of substantially m*h, where n and m are integers that may be different for each module, wherein w=(the width of the enclosure $W_E$/an integer between 1 and 6 inclusive) and h=(the height of the enclosure $H_E$/an integer), w, h, $W_E$ and $H_E$ each being measured in the same plane, wherein the power supply module is positioned adjacent the electronics module and is arranged to draw cooling air through the electronics module.

16. An enclosure according to claim 15, wherein the first dimension of said electronics module is twice the first dimension of said power supply module.

17. An enclosure according to claim 15, the enclosure having a midplane, wherein the at least one power supply module comprises:
a box-like housing having opposed first and second end faces and four side faces, the first end face having a connector for connecting to the midplane such that the second end face is accessible externally of the enclosure when positioned in the enclosure;
a first air inlet provided in the first end face;
a second air inlet provided in a side face;
an air outlet provided in the second end face; and,
a fan positioned adjacent the air outlet arranged so as to draw in air through the first and second air inlets, through the housing, and to vent the air through the air outlet.

18. An enclosure according to claim 15, wherein the enclosure has a height of 2 U and width of $W_E$ and comprises: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays.

19. An enclosure according to claim 15, wherein the enclosure has a height of 3 U and width of $W_E$ and comprises: a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays so as to be within an envelope having a width of $W_E$ and a height of 2 U.

20. An enclosure according to claim 15, wherein the enclosure has a height of 4U and width of $W_E$ and comprises: a first bank and a second bank of bays, each bank having a height of 2 U and a width of $W_E$ positioned one on top of the other, each bank having a first bay and a second bay each having a width of $W_E/4$ and a height of 2 U for receiving respective first and second of said power supply units, the power supply bays being at either side of the enclosure; and, a first bay and a second bay each having a width of $W_E/2$ and a height of U for receiving respective first and second of said electronics modules, the electronics module bays being positioned one on top of the other and between the power supply bays.

21. An enclosure according to claim 18, wherein the first and second power supply bays are arranged such that the position and orientation of the first power supply module is a 180 degrees rotation of the position and orientation of the second power supply module about an axis perpendicular to said plane of measurement.

22. An enclosure according to claim 21,
the enclosure having a midplane, wherein the plurality of modules includes at least two power supply modules each comprising:
a box-like housing having opposed first and second end faces and four side faces, the first end face having a connector for connecting to the midplane such that the second end face is accessible externally of the enclosure when positioned in the enclosure;
a first air inlet provided in the first end face;
a second air inlet provided in a side face;
an air outlet provided in the second end face; and,
a fan positioned adjacent the air outlet arranged so as to draw in air through the first and second air inlets, through the housing, and to vent the air through the air outlet;
wherein each power supply module is positioned and orientated so that each of said respective second air inlets faces inwards towards its adjacent electronics module, so that each of said respective fans draws air through its adjacent electronics module bay in use.

23. An enclosure and a plurality of modules according to claim 18, wherein the first and second electronics module bays are arranged such that the position and orientation of the first electronics module is a 180 degrees rotation of the position and orientation of the second electronics module about an axis perpendicular to said plane of measurement.

24. An enclosure according to claim 15, wherein the enclosure has a height of 4 U and width of $W_E$ and comprises: a first bay, a second bay, a third bay and a fourth bay each having a width of 2 U and a height of $W_E/4$ for receiving respective first, second, third and fourth power supply units, the power supply bays being adjacent each other so as to be within an envelope having a width of 8 U and a height of $W_E/4$; and, a first bay and a second bay each having a width $W_E/2$ and a height of U for receiving respective first and second electronics modules, the electronics module bays being positioned adjacent each other so as to be within an envelope having a width of $W_E$ and a height of U.

25. An enclosure according to claim 15, wherein the enclosure has a plurality of adjacent bays having the same width and height that are capable of receiving a corresponding number of individual modules or a single module having a correspondingly greater value of n or m.

26. An enclosure according to claim 15, comprising at least one cooling module, wherein the enclosure can accept the cooling module in place of at least one power supply module.

27. An enclosure according to claim 15, wherein w is between about 102.5 mm and about 109.5 mm.

28. An enclosure according to claim 15, wherein h is between about 36 mm and about 42 mm.

29. A midplane for a data storage device enclosure, the midplane comprising:
a circuit board having a front surface and a rear surface;
a plurality of connectors on the front surface for connecting to respective data storage devices;
a first power supply module connector and a first electronics module connector on the rear surface, the first power supply module connector and the first electronics module connector being generally elongate and having their long axes aligned in the direction of the width of the midplane; and,
a second power supply module connector and a second electronics module connector on the rear surface, the second power supply module connector and the second electronics module connector being generally elongate and having their long axes aligned in the direction of the width of the midplane;
the position and orientation of the second power supply module connector being a 180 degree rotation of the position and orientation of the first power supply module connector about an axis perpendicular to the plane of the circuit board; and, the position and orientation of the second electronics module connector being a 180 degree rotation of the position and orientation of the first electronics module connector about an axis perpendicular to the plane of the circuit board;

wherein said connectors on the rear surface do not overlap with any of the connectors on the front surface.

30. In combination, a midplane according to claim 29 and a first electronics module and a second electronics module connected to the first electronics module connector and the second electronics module connector respectively, the first electronics module having a circuit board and the second electronics module having a circuit board, wherein the circuit boards of the first and second electronics modules are separated in order to create a plenum for cooling air between them.

31. In combination, a midplane according to claim 29 and a first electronics module and a second electronics module connected to the first electronics module connector and the second electronics module connector respectively and a first power supply module and a second power supply module connected to the first power supply connector and the second power supply connector respectively, wherein each power supply is arranged to draw cooling air therethrough via a respective air inlet in its housing, the respective air inlets each being orientated towards the electronics modules.

32. A method of manufacturing a midplane for a data storage device enclosure, the midplane comprising:

a circuit board having a front surface and a rear surface;

a plurality of connectors on the front surface for connecting to respective data storage devices;

a first power supply module connector and a first electronics module connector on the rear surface, the first power supply module connector and the first electronics module connector being generally elongate and having their long axes aligned in the direction of the width of the midplane; and, a second power supply module connector and a second electronics module connector on the rear surface, the second power supply module connector and the second electronics module connector being generally elongate and having their long axes aligned in the direction of the width of the midplane;

the position and orientation of the second power supply module connector being a 180 degree rotation of the position and orientation of the first power supply module connector about an axis perpendicular to the plane of the circuit board; and, the position and orientation of the second electronics module connector being a 180 degree rotation of the position and orientation of the first electronics module connector about an axis perpendicular to the plane of the circuit board;

wherein said connectors on the rear surface do not overlap with any of the connectors on the front surface, the method comprising manufacturing the circuit board as a non-laminated piece.

33. A plurality of modules for being housed in a data storage device enclosure, at least one of the modules being a power supply module and at least one of the modules being an electronics module, wherein each module has a width of substantially n*w and a height of substantially m*h, where n and m are integers that may be different for each module, wherein w is between about 102.5 mm and about 109.5 mm and h is between about 36 mm and about 42 mm.

34. A plurality of data storage device enclosures, each enclosure comprising:

at least one power supply bay for accepting a power supply module, each power supply bay of each enclosure having a first dimension of substantially n*w and a second dimension of substantially m*h, where n and m are integers, which may be different for the different power supply bays and for the different enclosures, such that power supply modules are interchangeable between said enclosures; and, at least one electronics module bay for accepting an electronics module, each electronics module bay of each enclosure having a first dimension of substantially n*w and a second dimension of substantially in m*h, where n and m are integers, which may be different for the different electronics module bays and for the different enclosures, such that electronics modules are interchangeable between said enclosures, wherein w is between about 104.5 mm and about 110.5 mm and h is between about 38 mm and about 43 mm, wherein at least one of the number of bays or layout of bays is different for each enclosure.

35. A plurality of enclosures according to claim 34, wherein at least one enclosure has a height of 2 U and a width of $W_E$ and comprises:

a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays.

36. A plurality of enclosures according to claim 34, wherein at least one enclosure has a height of 3 U and width of $W_E$ and comprises:

a first bay and a second bay each having a width of $W_E/4$ and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays so as to be within an envelope having a width of $W_E$ and a height of 2 U.

37. A plurality of enclosures according claim 34, wherein at least one enclosure has a height of 4 U and width $W_E$ and comprises a first bank and a second bank of bays, each bank having a height of 2 U and a width of $W_E$ positioned one on top of the other, each bank having:

a first bay and a second bay each having a width of W/4 and a height of 2 U for receiving respective first and second power supply units, the power supply bays being at either side of the enclosure; and, a first bay and a second bay each having a width of $W_E/2$ and a height of U for receiving respective first and second electronics modules, the electronics module bays being positioned one on top of the other and between the power supply bays.

38. A plurality of enclosures according to claim 34, wherein at least one enclosure has a height of 4 U and width $W_E$ and comprises:

a first bay, a second bay, a third bay and a fourth bay each having a width of 2 U and a height of $W_E/4$ for receiving respective first, second, third and fourth power supply units, the power supply bays being adjacent each other so as to be within an envelope having a width of 8 U and a height of $W_E/4$; and, a first bay and a second bay each having a width $W_E/2$ and a height of U for receiving respective first and second electronics modules, the electronics module bays being positioned adjacent each other so as to be within an envelope having a width of $W_E$ and a height of U.

* * * * *